US012055763B2

(12) United States Patent
    Jia

(10) Patent No.: US 12,055,763 B2
(45) Date of Patent: Aug. 6, 2024

(54) OPTICAL SWITCHING APPARATUS, REDIRECTION METHOD, AND RECONFIGURABLE OPTICAL ADD-DROP MULTIPLEXER

(71) Applicant: Huawei Technologies Co., Ltd., Shenzhen (CN)

(72) Inventor: Wei Jia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 17/891,853

(22) Filed: Aug. 19, 2022

(65) Prior Publication Data
    US 2022/0390681 A1    Dec. 8, 2022

Related U.S. Application Data

(63) Continuation of application No. PCT/CN2020/137478, filed on Dec. 18, 2020.

(30) Foreign Application Priority Data

Feb. 21, 2020    (CN) .......................... 202010108090.1

(51) Int. Cl.
    *G02B 6/35*    (2006.01)
    *G02B 6/32*    (2006.01)
    *H04Q 11/00*    (2006.01)

(52) U.S. Cl.
    CPC .............. *G02B 6/3554* (2013.01); *G02B 6/32* (2013.01); *G02B 6/3512* (2013.01);
    (Continued)

(58) Field of Classification Search
    None
    See application file for complete search history.

(56) References Cited

U.S. PATENT DOCUMENTS 5,936,954 A * 8/1999 Song .................... H04L 49/1561
                                            370/398
6,570,521 B1 * 5/2003 Schofield ............ H03M 1/0673
                                            341/143
(Continued)

FOREIGN PATENT DOCUMENTS

CN      1936633 A      3/2007
CN    105008993 A     10/2015
(Continued)

OTHER PUBLICATIONS

Seno et al., "Wide-Passband C+L-Band Wavelength Selective Switch by Alternating Wave-Band Arrangement on LCOS," 2018 European Conference on Optical Communication (ECOC), Total 3 pages, Institute of Electrical and Electronics Engineers, New York, New York (Sep. 23-27, 2018).

*Primary Examiner* — Darren E Wolf
(74) *Attorney, Agent, or Firm* — Leydig, Voit & Mayer, Ltd.

(57)    ABSTRACT

An optical switching apparatus is provided. The apparatus includes one or more input ports, a dispersion assembly, a first lens assembly, a redirection assembly, and one or more output ports. The input ports are configured to input a first beam into a dispersion assembly at a first angle of incidence in a first direction, and to input a second beam into the dispersion assembly at a second angle of incidence in the first direction. A difference between absolute values of the first angle of incidence and the second angle of incidence is not zero, and enables a first region in which spots of the first beam are arranged and a second region in which spots of the second beam are arranged to be separated from each other in the first direction, and enables the first region and the second region to at least partially overlap in a second direction.

16 Claims, 13 Drawing Sheets

(52) U.S. Cl.
CPC ....... *G02B 6/3582* (2013.01); *H04Q 11/0005* (2013.01); *H04Q 2011/0015* (2013.01)

(56) References Cited

U.S. PATENT DOCUMENTS

| | | |
|---|---|---|
| 7,034,979 B1 | 4/2006 | Feng et al. |
| 9,575,260 B2 | 2/2017 | Keyworth et al. |
| 2010/0254652 A1* | 10/2010 | Kirkpatrick ........ H04Q 11/0005 398/45 |
| 2015/0188656 A1 | 7/2015 | Sakurai |
| 2017/0041691 A1* | 2/2017 | Rickman ............ H04Q 11/0071 |
| 2017/0105060 A1* | 4/2017 | Oltman .............. H04Q 11/0005 |
| 2021/0263218 A1* | 8/2021 | Robertson .................. G02F 1/29 |

FOREIGN PATENT DOCUMENTS

| | | |
|---|---|---|
| CN | 108353216 A | 7/2018 |
| CN | 109001865 A | 12/2018 |
| CN | 110121678 A | 8/2019 |
| EP | 2706389 A2 | 3/2014 |
| WO | 2018191862 A1 | 10/2018 |
| WO | 2019243809 A1 | 12/2019 |

\* cited by examiner

OPTICAL SWITCHING APPARATUS, REDIRECTION METHOD, AND RECONFIGURABLE OPTICAL ADD-DROP MULTIPLEXER

CROSS-REFERENCE TO RELATED APPLICATIONS

This application is a continuation of International Application No. PCT/CN2020/137478, filed on Dec. 18, 2020, which claims priority to Chinese Patent Application No. 202010108090.1, filed on Feb. 21, 2020. The disclosures of the aforementioned applications are hereby incorporated by reference in their entireties.

TECHNICAL FIELD

Embodiments of this application relate to the field of fiber optic communications, and in particular, to an optical switching apparatus, a redirection method, and a reconfigurable optical add-drop multiplexer.

BACKGROUND

With rapid development of an optical network service and an increase of a switching capacity, a signal band range that needs to be processed by a reconfigurable optical add-drop multiplexer (ROADM) also increases. A wavelength selective switch (WSS) is an important assembly that forms the ROADM.

A WSS shown in a conventional technology is shown in FIG. 1. A C-band beam and an L-band beam are input into an input port 101, and arrayed waveguide gratings (AWG) 102 and 103 are disposed in parallel in a dispersion direction X. Through use of the AWG 102 and the AWG 103, in the dispersion direction X, angles at which the C-band beam and the L-band beam are incident on a grating 105 after passing through a lens 104 are different, and in the dispersion direction X, angles at which the C-band beam and the L-band beam exit the grating 105 are the same, so that positions of an optical spot of the C-band beam and an optical spot of the L-band beam on a switching engine 106 are shown in FIG. 2. It can be learned that, on the switching engine 106, the C-band beam generates a plurality of C-band optical spots, and the L-band beam generates a plurality of L-band optical spots. A C-band optical spot 201 and an L-band optical spot 202 as an example. The C-band optical spot 201 and the L-band optical spot 202 are separated in a port direction Y, and overlap in the dispersion direction X, so that filtering bandwidth can be effectively improved.

However, if an AWG is disposed in the WSS, insertion loss of optical coupling of the AWG and space is increased. Due to different angles at which the C-band beam and the L-band beam are incident to the grating 105, a width of a component such as the lens 104 in the dispersion direction X increases.

SUMMARY

This application provides an optical switching apparatus, a redirection method, and a reconfigurable optical add-drop multiplexer, to improve filtering bandwidth and effectively reduce insertion loss.

A first aspect of this application provides an optical switching apparatus, including an input port, a dispersion assembly, a first lens assembly, a redirection assembly, and an output port. The input port is configured to input a first beam into the dispersion assembly at a first angle of incidence in a first direction, the input port is further configured to input a second beam into the dispersion assembly at a second angle of incidence in the first direction, and a difference between absolute values of the first angle of incidence and the second angle of incidence is not zero. The dispersion assembly is configured to disperse the first beam to form a plurality of first sub-beams, and the dispersion assembly is further configured to disperse the second beam to form a plurality of second sub-beams. The first lens assembly is configured to focus the plurality of first sub-beams and the plurality of second sub-beams to the redirection assembly, the plurality of first sub-beams are incident on a first region of the redirection assembly, the plurality of second sub-beams are incident on a second region of the redirection assembly, and the difference between the absolute values of the first angle of incidence and the second angle of incidence enables the first region and the second region to be separated from each other in the first direction, and enables the first region and the second region to at least partially overlap in a second direction. The first direction is perpendicular to the second direction, and both the first direction and the second direction are perpendicular to a propagation direction of the first beam. The output port is configured to output the plurality of first sub-beams and the plurality of second sub-beams that are redirected by the redirection assembly.

In the optical switching apparatus shown in this aspect, a value of an angle at which a beam is incident on the dispersion assembly in the first direction is adjusted, so that it can be effectively ensured that an angle at which the first beam exits the dispersion assembly in the second direction is equal to or approximately equal to an angle at which the second beam exits the dispersion assembly in the second direction. In this way, insertion loss is reduced as much as possible while filtering bandwidth of the optical switching apparatus is effectively improved, and in addition, an angle at which the first beam is incident on the dispersion assembly in the second direction is equal to or approximately equal to an angle at which the second beam is incident on the dispersion assembly in the second direction, so that a structure of the optical switching apparatus in the second direction is more compact.

With reference to the first aspect of this application, in an optional implementation, that the first region and the second region at least partially overlap in the second direction includes: The first region is positions at which the plurality of first sub-beams generate first optical spots, the second region is positions at which the plurality of second sub-beams generate second optical spots, and the first optical spots and the second optical spots at least partially overlap in the second direction.

With reference to the first aspect of this application, in an optional implementation, a plurality of optical spots included in the first optical spots are in a one-to-one correspondence with a plurality of optical spots included in the second optical spots.

In the optical switching apparatus shown in this aspect, because the plurality of optical spots included in the first optical spots and the plurality of optical spots included in the second optical spots are in a one-to-one correspondence, in the first optical spots and the second optical spots, optical spots that are arranged in a same sequence at least partially overlap in the second direction, and are separated from each other in the first direction, so that the filtering bandwidth of the optical switching apparatus is effectively improved.

With reference to the first aspect of this application, in an optional implementation, the input port is configured to input the first beam into the dispersion assembly at a third angle of incidence in the second direction, the input port is further configured to input the second beam into the dispersion assembly at a fourth angle of incidence in the second direction, and a difference between the third angle of incidence and the fourth angle of incidence falls within a preset range.

In the optical switching apparatus shown in this aspect, when the difference between the third angle of incidence and the fourth angle of incidence falls within the preset range, only the first angle of incidence and the second angle of incidence need to be adjusted without a need to adjust the third angle of incidence and the fourth angle of incidence, to ensure that the angle at which the first beam exits the dispersion assembly in the second direction is equal to or approximately equal to the angle at which the second beam exits the dispersion assembly in the second direction. In this way, the filtering bandwidth of the optical switching apparatus is effectively improved.

With reference to the first aspect of this application, in an optional implementation, a second lens assembly is included between the input port and the dispersion assembly, and the second lens assembly is configured to couple the first beam and the second beam to the dispersion assembly.

With reference to the first aspect of this application, in an optional implementation, a third lens assembly is included between the input port and the dispersion assembly, and the first angle of incidence and/or the second angle of incidence depend/depends on a position of the third lens assembly.

With reference to the first aspect of this application, in an optional implementation, the first angle of incidence and/or the second angle of incidence depend/depends on a distance between the input port and a primary optical axis of the third lens assembly.

In the optical switching apparatus shown in this aspect, the third lens assembly adjusts a value of the first angle of incidence at which the first beam is incident on the dispersion assembly in the first direction and adjusts a value of the second angle of incidence at which the second beam is incident on the dispersion assembly in the first direction, so that it can be effectively ensured that the angle at which the first beam exits the dispersion assembly in the second direction is equal to or approximately equal to the angle at which the second beam exits the dispersion assembly in the second direction. In this way, the insertion loss is reduced as much as possible while the filtering bandwidth of the optical switching apparatus is improved, and in addition, the angle at which the first beam is incident on the dispersion assembly in the second direction is equal to or approximately equal to the angle at which the second beam is incident on the dispersion assembly in the second direction, so that a structure of the optical switching apparatus in the second direction is more compact.

With reference to the first aspect of this application, in an optional implementation, the dispersion assembly is configured to emit the plurality of first sub-beams at a first angle of emergence in the second direction, and is further configured to emit the plurality of second sub-beams at a second angle of emergence in the second direction, and a difference between the first angle of emergence and the second angle of emergence falls within a preset range.

In the optical switching apparatus shown in this aspect, because the difference between the first angle of emergence and the second angle of emergence falls within the preset range, the first region and the second region at least partially overlap in the second direction, and further, the first region and the second region are at least partially separated in the first direction, so that the filtering bandwidth of the optical switching apparatus is improved.

With reference to the first aspect of this application, in an optional implementation, a value of a focal length of the first lens assembly is related to a value of a target distance, and the target distance is a distance between two optical spots in a one-to-one correspondence in the first direction.

With reference to the first aspect of this application, in an optional implementation, a distance between the first lens assembly and the redirection assembly is equal to the focal length of the first lens assembly, and a distance between the first lens assembly and the dispersion assembly is equal to the focal length of the first lens assembly.

With reference to the first aspect of this application, in an optional implementation, the optical switching apparatus further includes a collimating lens that is located between the input port and the second lens assembly, and the collimating lens is configured to collimate the first beam and the second beam. The input port is located at a front focus of the collimating lens.

With reference to the first aspect of this application, in an optional implementation, the redirection assembly is configured to deflect a propagation direction of each first sub-beam and a propagation direction of each second sub-beam, the first lens assembly is configured to separately focus the first sub-beam and the second sub-beam to the dispersion assembly, the dispersion assembly is configured to combine the plurality of first sub-beams to generate a first output beam, the dispersion assembly is configured to combine the plurality of second sub-beams to generate a second output beam, the third lens assembly is configured to couple the first output beam and the second output beam from the dispersion assembly to the second lens assembly, and the second lens assembly is configured to adjust an optical propagation path of the first output beam and an optical propagation path of the second output beam to propagate the first output beam and the second output beam to the collimating lens, and the first output beam and the second output beam that are collimated by the collimating lens are output through the output port.

With reference to the first aspect of this application, in an optional implementation, the first beam and the second beam have at least one different wavelength value.

With reference to the first aspect of this application, in an optional implementation, the optical switching apparatus further includes a filter, the filter includes the input port, the filter is configured to receive an optical signal from an optical fiber, and the filter is further configured to split the optical signal into the first beam and the second beam.

In the optical switching apparatus shown in this aspect, a quantity of input ports and a quantity of output ports can be effectively reduced by using the filter.

With reference to the first aspect of this application, in an optional implementation, the input port includes a first input port and a second input port, the first input port is configured to input the first beam, the second input port is configured to input the second beam, and positions of the first input port and the second input port in the second direction at least partially overlap.

With reference to the first aspect of this application, in an optional implementation, the first beam is a C-band beam, and the second beam is an L-band beam.

A second aspect of this application provides a redirection method. The redirection method is applied to an optical switching apparatus, and the optical switching apparatus includes an input port, a dispersion assembly, a first lens assembly, a redirection assembly, and an output port. The method includes: inputting a first beam into the dispersion assembly at a first angle of incidence in a first direction through the input port; inputting a second beam into the dispersion assembly at a second angle of incidence in the first direction through the input port, where a difference between absolute values of the first angle of incidence and the second angle of incidence is not zero; dispersing the first beam by using the dispersion assembly to form a plurality of first sub-beams; dispersing the second beam by using the dispersion assembly to form a plurality of second sub-beams; focusing the plurality of first sub-beams and the plurality of second sub-beams to the redirection assembly by using the first lens assembly, where the plurality of first sub-beams are incident on a first region of the redirection assembly, the plurality of second sub-beams are incident on a second region of the redirection assembly, the difference between the absolute values of the first angle of incidence and the second angle of incidence enables the first region and the second region to be separated from each other in the first direction, and enables the first region and the second region to at least partially overlap in a second direction, the first direction is perpendicular to the second direction, and both the first direction and the second direction are perpendicular to a propagation direction of the first beam; and outputting, through the output port, the plurality of first sub-beams and the plurality of second sub-beams that are redirected by the redirection assembly.

For descriptions of a specific execution process and beneficial effects of the redirection method shown in this aspect, refer to the first aspect. Details are not described again.

With reference to the second aspect of this application, in an optional implementation, that the first region and the second region at least partially overlap in the second direction includes: The first region is positions at which the plurality of first sub-beams generate first optical spots, the second region is positions at which the plurality of second sub-beams generate second optical spots, and the first optical spots and the second optical spots at least partially overlap in the second direction.

With reference to the second aspect of this application, in an optional implementation, a plurality of optical spots included in the first optical spots are in a one-to-one correspondence with a plurality of optical spots included in the second optical spots.

With reference to the second aspect of this application, in an optional implementation, the method further includes: inputting the first beam into the dispersion assembly at a third angle of incidence in the second direction through the input port, and inputting the second beam into the dispersion assembly at a fourth angle of incidence in the second direction through the input port, where a difference between the third angle of incidence and the fourth angle of incidence falls within a preset range.

With reference to the second aspect of this application, in an optional implementation, a second lens assembly is included between the input port and the dispersion assembly, and the method further includes: coupling the first beam and the second beam to the dispersion assembly by using the second lens assembly.

With reference to the second aspect of this application, in an optional implementation, a third lens assembly is included between the input port and the dispersion assembly, and the method further includes: adjusting the first angle of incidence and/or the second angle of incidence by using the third lens assembly, where the first angle of incidence and/or the second angle of incidence depend/depends on a position of the third lens assembly.

With reference to the second aspect of this application, in an optional implementation, the first angle of incidence and/or the second angle of incidence depend/depends on a distance between the input port and a primary optical axis of the third lens assembly.

With reference to the second aspect of this application, in an optional implementation, the method further includes: emitting the plurality of first sub-beams at a first angle of emergence in the second direction by using the dispersion assembly; and emitting the plurality of second sub-beams at a second angle of emergence in the second direction by using the dispersion assembly, where a difference between the first angle of emergence and the second angle of emergence falls within a preset range.

With reference to the second aspect of this application, in an optional implementation, the method further includes: adjusting a target distance by using the first lens assembly, where a value of a focal length of the first lens assembly is related to a value of the target distance, and the target distance is a distance between two optical spots in a one-to-one correspondence in the first direction.

With reference to the second aspect of this application, in an optional implementation, the optical switching apparatus further includes a filter, the filter includes the input port, and the method further includes: receiving an optical signal from an optical fiber by using the filter; and separating the optical signal into the first beam and the second beam by using the filter.

With reference to the second aspect of this application, in an optional implementation, the input port includes a first input port and a second input port, and the method further includes: inputting the first beam through the first input port; and inputting the second beam through the second input port, where positions of the first input port and the second input port in the second direction at least partially overlap.

A third aspect of this application provides a reconfigurable optical add-drop multiplexer, including a plurality of optical switching apparatuses. Different optical switching apparatuses are connected to each other by using an optical fiber, and the optical switching apparatus is shown in the first aspect, and is not described again.

DESCRIPTION OF EMBODIMENTS

The following clearly describes the technical solutions in embodiments of the present invention with reference to the accompanying drawings in embodiments of the present invention. It is clear that the described embodiments are merely a part rather than all of embodiments of the present invention. All other embodiments obtained by a person skilled in the art based on embodiments of the present invention without creative efforts shall fall within the protection scope of the present invention.

Figure 1:
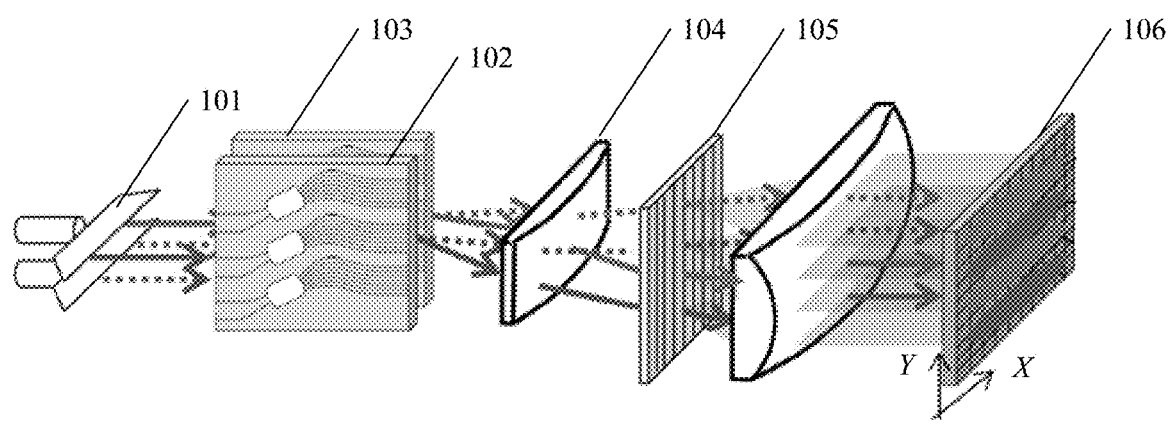
FIG. 1 is a schematic diagram of a structure of a wavelength selective switch according to a conventional technology.
Figure 2:
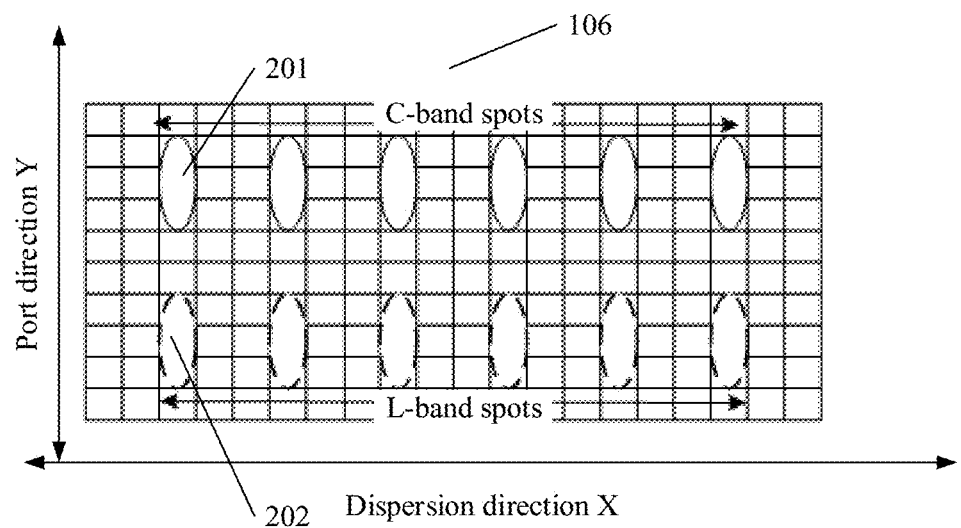
FIG. 2 is a schematic diagram of arrangement of optical spots on a switching engine according to a conventional technology.
Figure 3:
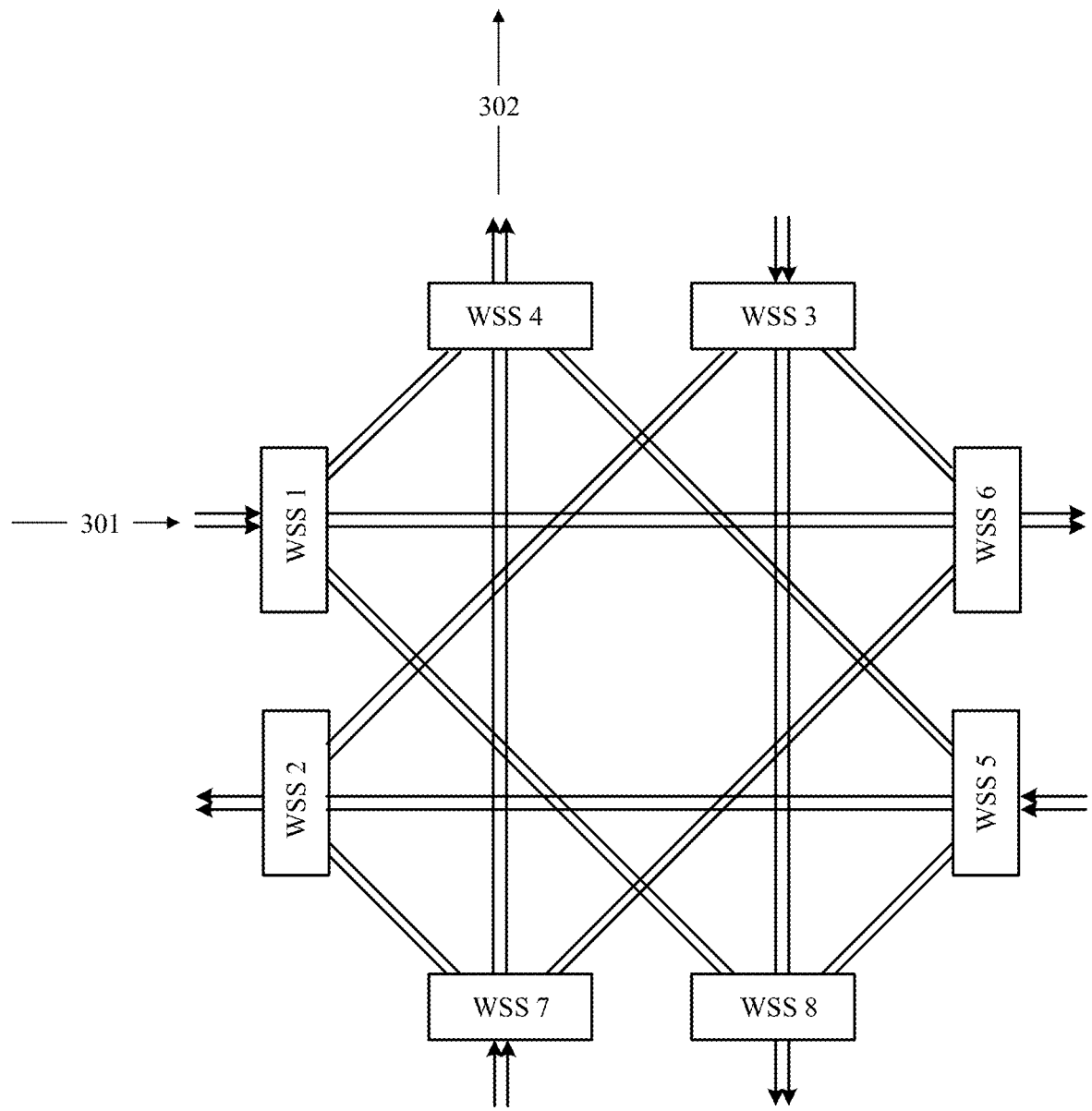
FIG. 3 is a schematic diagram of a structure of a reconfigurable optical add-drop multiplexer according to this application.

First, a structure of a ROADM provided in this application is described with reference to FIG. 3. FIG. 3 is a schematic diagram of a structure of the ROADM according to this application.

A specific network structure of the ROADM is not limited in this embodiment. For example, the ROADM may use a network structure such as a chain, a ring, and a mesh network. As shown in FIG. 3, as an example for description, the ROADM uses the network structure of a mesh network.

In this embodiment, for example, the ROADM includes eight WSSs (that is, a WSS 1 and a WSS 2 to a WSS 8). The eight WSSs are located at different positions. A quantity of WSSs included in the ROADM and a position of each WSS are not limited in this embodiment. The WSSs at different positions are configured to exchange optical signals, to flexibly schedule the optical signals. Different positions shown in this embodiment may indicate different directions in N dimensions, where N is a positive integer greater than or equal to 1.

The WSS 1 is used as an example. The WSS 1 may propagate an optical signal to any WSS that is included in the ROADM and that is connected to the WSS 1 by using an optical fiber, to switch the optical signal in directions in different dimensions. For example, in the ROADM shown in this embodiment, a WSS 4, a WSS 6, and the WSS 8 are connected to the WSS 1 by using an optical fiber, and the WSS 1 may propagate the optical signal to any one of the WSS 4, the WSS 6, and the WSS 8. In this embodiment, as an example for description, the WSS 1 is connected to the WSS 4, the WSS 6, and the WSS 8 by using an optical fiber, and this is not limited. In another example, the WSS 1 may alternatively be connected, by using an optical fiber, to any one of the WSS 2, a WSS 3, a WSS 5, and a WSS 7 included in the ROADM.

The WSS 1 and the WSS 4 are still used as an example to describe switching of the optical signal.

An optical signal propagated in a first direction 301 is input into the WSS 1 through an input port of the WSS 1, the optical signal is redirected by the WSS 1, the optical signal is propagated to the WSS 4 through an output port of the WSS 1 by using an optical fiber, and an optical signal output from an output port of the WSS 4 is propagated in a second direction 302, to switch a propagation direction of the optical signal from the first direction 301 to the second direction 302.

A structure of an optical switching apparatus provided in this application is described with reference to different embodiments.

Embodiment 1

Figure 4:
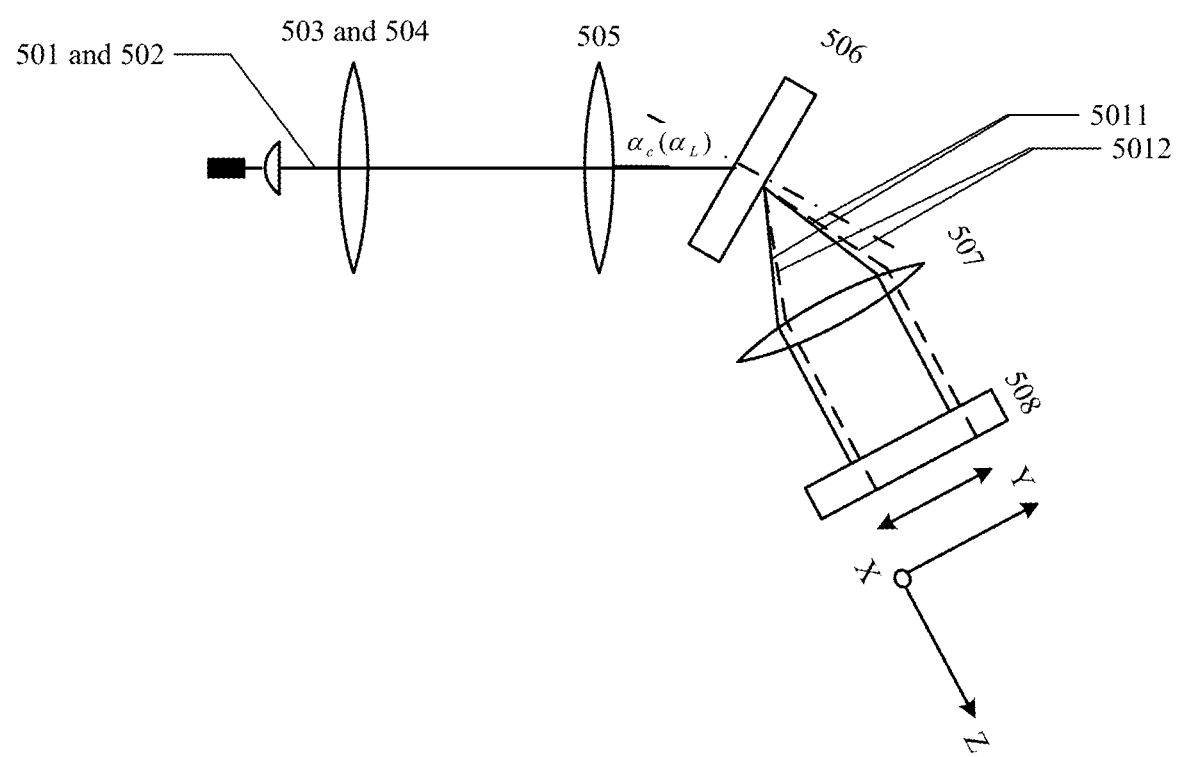
FIG. 4 is a schematic diagram of a structure of an optical switching apparatus in a second direction according to this application.
Figure 5:
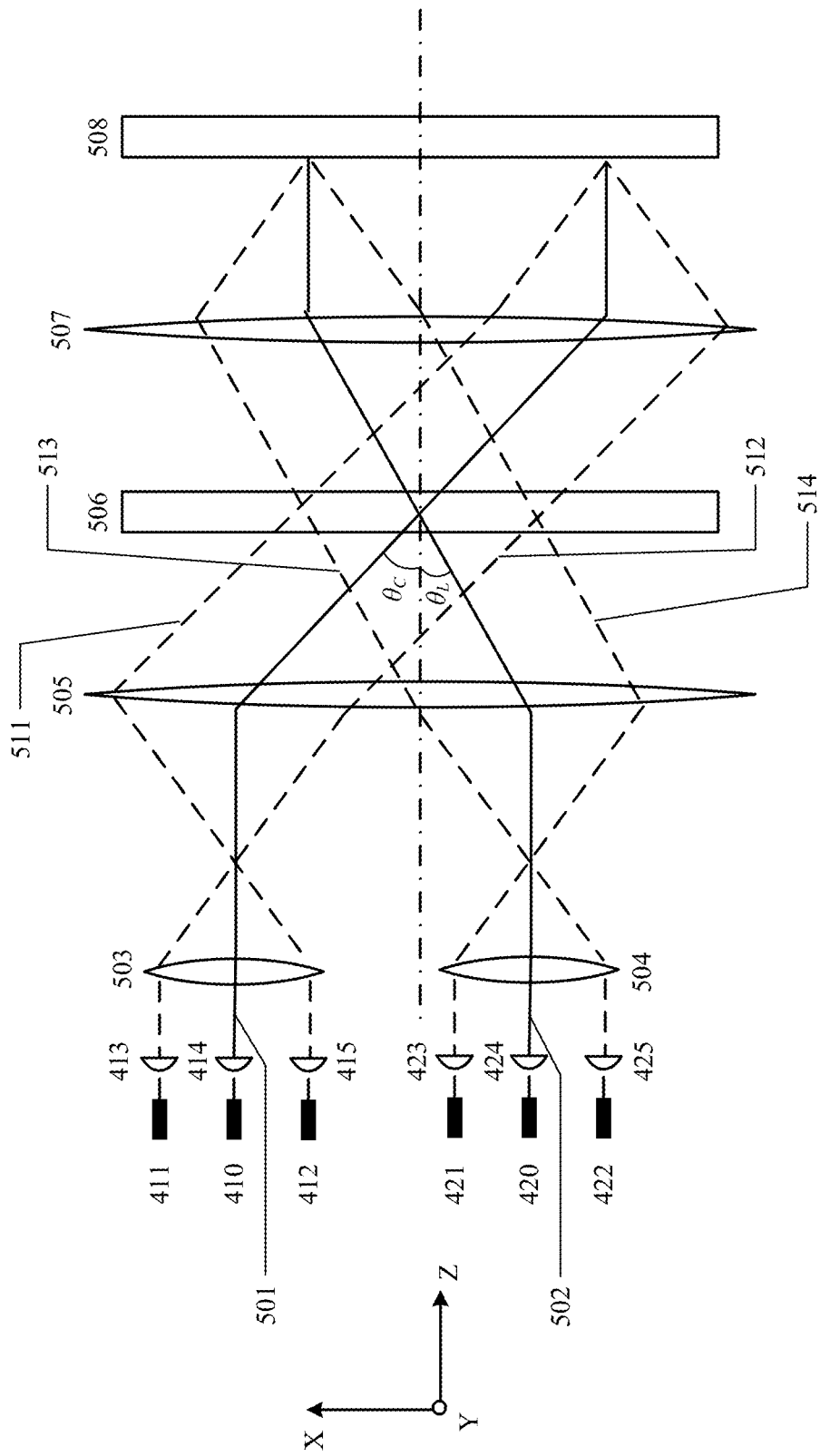
FIG. 5 is a schematic diagram of a structure of an optical switching apparatus in a first direction according to this application.

The following describes a specific structure of an optical switching apparatus provided in this application with reference to FIG. 4 and FIG. 5. FIG. 4 is a schematic diagram of a structure of the optical switching apparatus along a second direction, and FIG. 5 is a schematic diagram of a structure of the optical switching apparatus along a first direction. In this embodiment, an example in which the optical switching apparatus is a WSS is used. With reference to FIG. 3, an example in which the optical switching apparatus is specifically a WSS 1 is used.

The optical switching apparatus shown in this embodiment includes an input port, a dispersion assembly 506, a first lens assembly 507, a redirection assembly 508, and an output port. A specific quantity of input ports and a specific quantity of output ports are not limited in this embodiment.

The following first describes a first direction and a second direction in this application. The first direction in this embodiment may also be referred to as a switching direction or a port direction, and the second direction may also be referred to as a wavelength direction or a dispersion direction. With reference to different components included in the optical switching apparatus, definitions of the first direction and the second direction are different. Specific definitions are as follows:

Definition 1

Figure 6:
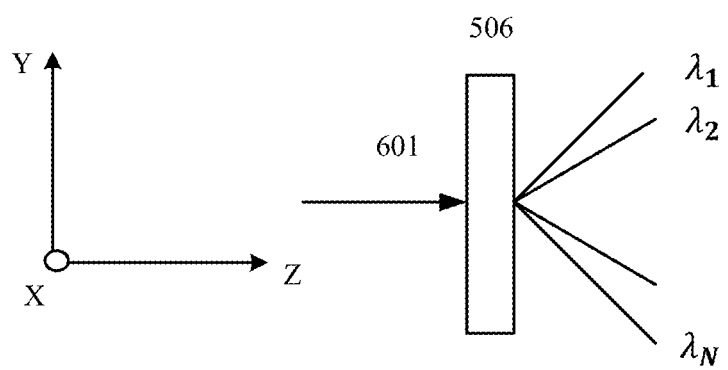
FIG. 6 is a schematic diagram of dispersion of a beam by a dispersion assembly according to this application.

With reference to the dispersion assembly 506, as shown in FIG. 6, the dispersion assembly 506 is configured to disperse a beam 601 irradiated on the dispersion assembly 506 to form a plurality of sub-beams with different wavelengths, for example, form a sub-beam with a wavelength $\lambda_1$, a sub-beam with a wavelength $\lambda_2$, and so on, to a sub-beam with a wavelength $\lambda_N$. A specific value of N is not limited in this example, provided that $\lambda_1$, $\lambda_2$, to $\lambda_N$ are different from each other. The dispersion assembly 506 can enable the sub-beam with the wavelength $\lambda_1$, the sub-beam with the wavelength $\lambda_2$, to the sub-beam with the wavelength $\lambda_N$ to be emitted from the dispersion assembly 506 at different angles of emergence for propagation, where the second direction Y is a direction in which the emergent sub-beams are scattered, that is, a direction in which the dispersion assembly 506 enables the plurality of sub-beams to disperse. A propagation direction of the beam 601 is a direction Z shown in FIG. 6, and a first direction X is a direction perpendicular to both the second direction Y and the propagation direction Z of the beam 601.

Definition 2

Figure 7:
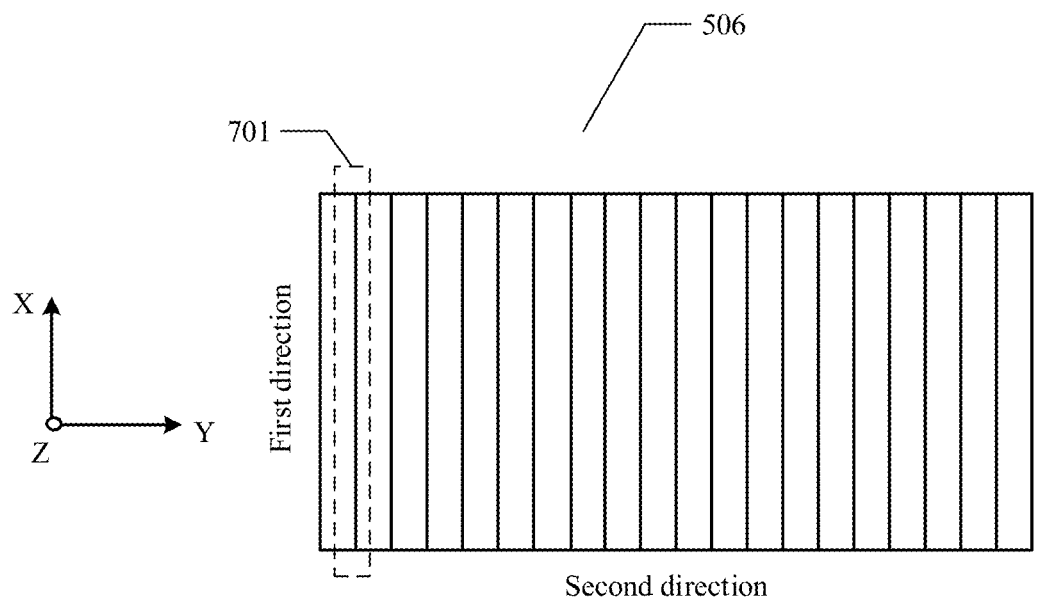
FIG. 7 is a schematic diagram of a structure of a dispersion assembly according to this application.

Still refer to the dispersion assembly 506. With reference to FIG. 7, this example is described by using an example in which the dispersion assembly 506 is a grating. In this example, the first direction X is a direction parallel to a grating scale 701, and the second direction Y is a direction perpendicular to the grating scale 701. It can be learned that the first direction X is perpendicular to the second direction Y.

Definition 3

Figure 8:
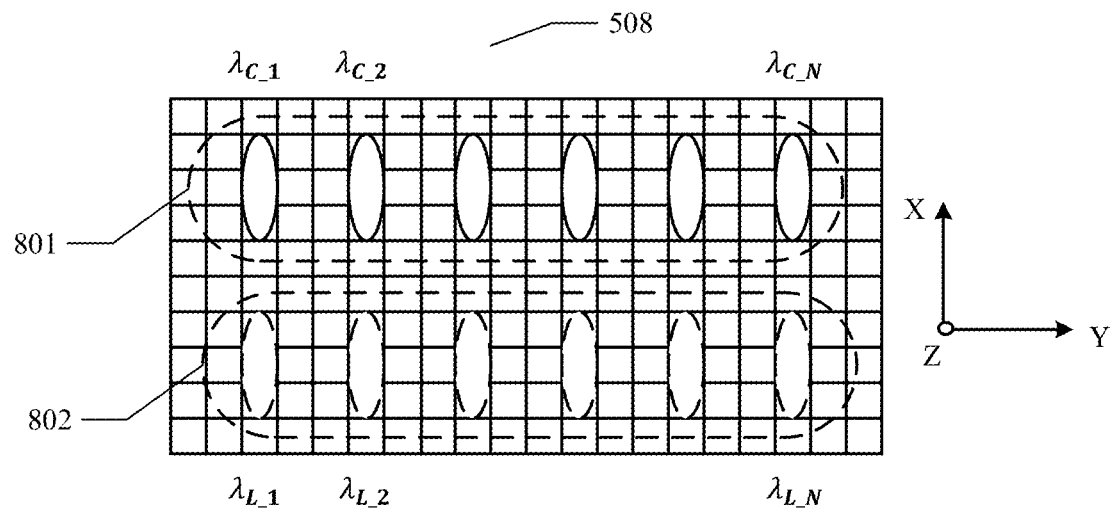
FIG. 8 is a schematic diagram of arrangement of optical spots on a redirection assembly according to this application.

This definition is described by using an example in which a first beam and a second beam are input into the input port, and a redirection assembly 508 is used as a reference. As shown in FIG. 8, the redirection assembly 508 forms a first region 801 and a second region 802. The first region 801 includes a plurality of spots generated by the first beam, and the second region 802 includes a plurality of spots generated by the second beam. Both the first beam and the second beam have specific band ranges, and a band range of the first beam is different from a band range of the second beam. For example, the first beam is a C-band beam, and the second beam is an L-band beam. The second direction Y is an arrangement direction of a plurality of spots in a same region. For example, the second direction Y is an arrangement direction of a plurality of spots included in the first region 801. For another example, the second direction Y is an arrangement direction of a plurality of spots included in the second region 802. Optionally, if the redirection assembly 508 is a liquid crystal on silicon (LCOS) chip, the first direction X is a direction in which the redirection assembly 508 loads a phase grating to generate diffracted light. Further optionally, if the redirection assembly 508 is a liquid crystal array chip or a micro-electro-mechanical system (MEMS), the first direction is a propagation direction of a deflected beam. The first direction X is also an arrangement direction of the first region 801 and the second region 802, that is, the second direction Y is an arrangement direction of a plurality of spots in a same band range, and the first direction X is an arrangement direction of spots in different band ranges. It can be learned that the first direction X is perpendicular to the second direction Y, and both the first direction X and the second direction Y are perpendicular to a propagation direction Z of the first beam and a propagation direction Z of the second beam.

Definition 4

Refer to the input port and the output port shown in FIG. 5. Specifically, the optical switching apparatus includes two input ports, namely, an input port 410 and an input port 420, and the optical switching apparatus further includes four output ports, namely, output ports 411, 412, 421, and 422. It should be noted that the descriptions of the quantities of input ports and output ports shown in FIG. 5 is an optional example, and this is not limited. In FIG. 5, the first direction X is an arrangement direction of the plurality of input ports and the plurality of output ports. It can be learned that, along the first direction X, locations of the plurality of input ports and the plurality of output ports are separated. As shown in FIG. 4, along the second direction Y, the plurality of input ports and the plurality of output ports may completely or partially overlap. The first direction X is also a direction in which the redirection assembly 508 deflects the first beam 501 input through the input port 410 and the second beam 502 input through the input port 420 to generate a deflection angle. The second direction Y is perpendicular to the first direction X, and both the first direction X and the second direction Y are perpendicular to a propagation direction Z of the first beam 501 and a propagation direction Z of the second beam 502.

In this embodiment, as an example for description, the optical switching apparatus is configured to perform optical switching on the first beam 501 and the second beam 502. In another example, the optical switching apparatus may alternatively perform optical switching on more than two beams. A quantity of beams on which optical switching is specifically performed is not limited in this embodiment. The first beam 501 and the second beam 502 in this embodiment have different wavelength ranges. That the first beam 501 and the second beam 502 have different wavelength ranges is described by using an example below with reference to a specific example.

For example, the first beam 501 in this embodiment is a C-band beam, and the second beam 502 is an L-band beam. Descriptions of specific bands of the first beam 501 and the second beam 502 in this embodiment are examples, and are not limited. For example, the first beam 501 may alternatively be an E-band beam, and the second beam 502 may alternatively be an O-band beam, provided that the first beam 501 and the second beam 502 are different bands. Specifically, for example, the first beam 501 has N wavelength values: $\lambda_{L-1}, \lambda_{c-1}, \lambda_{c-2}, \ldots$, and $\lambda_{c-N}$, and the second beam 502 may also have N wavelength values: $\lambda_{L-1}, \lambda_{L-2}, \ldots$, and $\lambda_{L-N}$. A value of N is not limited in this embodiment. A quantity of wavelength values of the first beam 501 and a quantity of wavelength values of the second beam 502 may alternatively be different. That the first beam 501 and the second beam 502 have different wavelength ranges may specifically mean that wavelength values in $\lambda_{c-1}, \lambda_{c-2}, \ldots$, and $\lambda_{c-N}$ and $\lambda_{L-1}, \lambda_{L-2}, \ldots$, and $\lambda_{L-N}$ are different. That the first beam 501 and the second beam 502 have different wavelength ranges may alternatively mean that there are one or more different wavelength values in $\lambda_{c-1}, \lambda_{c-2}, \ldots$, and $\lambda_{c-N}$ and $\lambda_{L-1}, \lambda_{L-2}, \ldots$, and $\lambda_{L-N}$. In other words, in $\lambda_{c-1}, \lambda_{c-2}, \ldots$, and $\lambda_{c-N}$ and $\lambda_{L-1}, \lambda_{L-2}, \ldots$, and $\lambda_{L-N}$, some wavelength values are the same, and some wavelength values are different.

The components of the optical switching apparatus are described below.

For example, as shown in FIG. 5, the input port 410 included in the optical switching apparatus is configured to input the first beam 501, and the input port 420 is configured to input the second beam 502. Positions of the input port 410 and the input port 420 are described below.

As shown in FIG. 4, in the second direction Y, positions of the input port 410 and the input port 420 in the second direction Y at least partially overlap. Specifically, for example, the input port 410 and the input port 420 entirely overlap, and for another example, the input port 410 and the input port 420 partially overlap. As shown in FIG. 5, in the first direction X, the position of the input port 410 and the position of the input port 420 are separated, and the input port 410 and the input port 420 are disposed in parallel in the first direction X. In this embodiment, a distance by which the positions of the input port 410 and the input port 420 are separated in the second direction Y is not limited.

Figure 9:
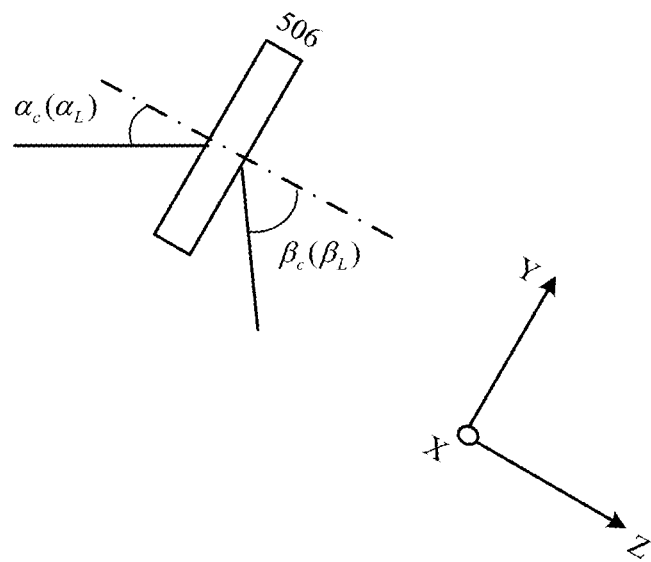
FIG. 9 is another schematic diagram of dispersion of a beam by a dispersion assembly according to this application.

For example, with reference to FIG. 4 and FIG. 9, the input port 410 is configured to input the first beam 501 into the dispersion assembly 506 at a third angle of incidence $\alpha_c$ in the second direction Y, and the input port 420 is further configured to input the second beam 502 into the dispersion assembly 506 at a fourth angle of incidence $\alpha_1$ in the second direction Y.

When the positions of the input port 410 and the input port 420 in the second direction at least partially overlap, a difference between the third angle of incidence $\alpha_c$ and the fourth angle of incidence $\alpha_1$ falls within a preset range. A value of the preset range is not limited in this embodiment provided that the third angle of incidence $\alpha_c$ is equal to or approximately equal to the fourth angle of incidence $\alpha_1$. For example, if the positions of the input port 410 and the input port 420 in the second direction entirely overlap, the third angle of incidence $\alpha_c$ is equal to the fourth angle of incidence $\alpha_1$.

Optionally, as shown in FIG. 5, in the first direction X or the second direction Y, a collimating lens array (that is, including a collimating lens 413, a collimating lens 414, and a collimating lens 415) is further included between each port (that is, the input port 410, the output port 411, and the output port 412) configured to propagate the first beam 501 and the dispersion assembly 506. The input port 410 is located at a front focus of the collimating lens 414, the output port 411 is located at a front focus of the collimating lens 413, and the output port 412 is located at a front focus of the collimating lens 415. The collimating lens 414 is configured to collimate the first beam 501 from the input port 410.

In the first direction X or the second direction Y, a collimating lens array (that is, including a collimating lens 423, a collimating lens 424, and a collimating lens 425) is further included between each port (that is, the input port 420, the output port 421, and the output port 422) configured to propagate the second beam and the dispersion assembly 506. The input port 420 is located at a front focus of the collimating lens 424, the output port 421 is located at a front focus of the collimating lens 423, and the output port 422 is located at a front focus of the collimating lens 425. The collimating lens 424 is configured to collimate the second beam 502 from the input port 420.

Optionally, still with reference to FIG. 4 and FIG. 5, in the first direction X or the second direction Y, a second lens assembly is included between the collimating lens array and the dispersion assembly 506. The second lens assembly shown in this embodiment includes a plurality of lenses, and a quantity of lenses included in the second lens assembly is equal to a quantity of beams that are propagated to the optical switching apparatus. Specifically, when the first beam 501 and the second beam 502 are input into the optical switching apparatus, the second lens assembly includes a first lens 503 and a second lens 504. The first lens 503 is located between the collimating lens array (that is, the collimating lenses 413, 414, and 415) and the dispersion assembly 506, and the second lens 504 is located between the collimating lens array (that is, the collimating lenses 423, 424, and 425) and the dispersion assembly 506. For example, in the first direction X or the second direction Y, a back focus of the collimating lens 414 overlaps a front focus of the first lens 503; in other words, a distance between the collimating lens 414 and the first lens 503 is equal to a sum of a focal length of the collimating lens 414 and a focal length of the first lens 503. A back focus of the collimating lens 424 overlaps a front focus of the second lens 504; in other words, a distance between the collimating lens 424 and the second lens 504 is equal to a sum of a focal length of the collimating lens 424 and a focal length of the second lens 504.

The first lens 503 is configured to couple the first beam 501 from the collimating lens 414 to the third lens assembly 505, and the second lens 504 is configured to couple the second beam 502 from the collimating lens 424 to the third lens assembly 505. Coupling shown in this embodiment is a process in which an optical signal is propagated from one optical component to another optical component in the field of fiber optic communications. Optionally, in another example, alternatively, the optical switching apparatus may not include the second lens assembly, and the first beam 501 and the second beam 502 may alternatively be coupled to the third lens assembly 505 without using the second lens assembly.

The third lens assembly 505 is located between the second lens assembly and the dispersion assembly 506, and the third lens assembly 505 includes one or more lenses. In this embodiment, as an example for description, the third lens assembly 505 includes one lens. The dispersion assembly 506 is located at a back focus of the third lens assembly 505, and a distance between the third lens assembly 505 and the first lens 503 is equal to a sum of a focal length of the third lens assembly 505 and the focal length of the first lens 503. A distance between the third lens assembly 505 and the second lens 504 is equal to a sum of the focal length of the third lens assembly 505 and the focal length of the second lens 504.

The third lens assembly 505 is configured to couple the first beam 501 from the first lens 503 to the dispersion assembly 506, and the third lens assembly 505 is further configured to couple the second beam 502 from the second lens 504 to the dispersion assembly 506. As shown in FIG. 4, the dispersion assembly 506 is configured to disperse the first beam 501 to form a plurality of first sub-beams 5011 (that is, a solid-line part emitted from the dispersion assembly 506), and the dispersion assembly 506 is further configured to disperse the second beam 502 to form a plurality of second sub-beams 5012 (that is, a dashed-line part emitted from the dispersion assembly 506). A specific quantity of first sub-beams 5011 and a specific quantity of second sub-beams 5012 are not limited in this embodiment. The plurality of first sub-beams 5011 have mutually different wavelength values, the plurality of second sub-beams 5012 have mutually different wavelength values, and there is at least one different wavelength value in a plurality of wavelength values of the plurality of first sub-beams 5011 and a plurality of wavelength values of the plurality of second sub-beams 5012. For example, the plurality of wavelength values of the plurality of first sub-beams 5011 and the plurality of wavelength values of the plurality of second sub-beams 5012 are different, or the plurality of wavelength values of the plurality of first sub-beams 5011 and the plurality of wavelength values of the plurality of second sub-beams 5012 are different.

The first lens assembly 507 is disposed between the dispersion assembly 506 and the redirection assembly 508. The first lens assembly 507 shown in this embodiment may include one or more lenses. In this embodiment, as an example for description, the first lens assembly 507 includes one lens. The dispersion assembly 506 is located at a front focus of the first lens assembly 507. It can be learned that a distance between the dispersion assembly 506 and the first lens assembly 507 is equal to a focal length of the first lens assembly 507. The redirection assembly 508 is located at a back focus of the first lens assembly 507. It can be learned that a distance between the redirection assembly 508 and the first lens assembly 507 is equal to the focal length of the first lens assembly 507.

As shown in FIG. 4 and FIG. 5, the first lens assembly 507 is configured to focus the plurality of first sub-beams 5011 and the plurality of second sub-beams 5012 to the redirection assembly 508. Optical spots generated after the plurality of first sub-beams 5011 are incident on the redirection assembly 508 and optical spots generated after the plurality of second sub-beams 5012 are incident on the redirection assembly 508 are located at different positions on the redirection assembly 508. Positions of the optical spots generated after the plurality of first sub-beams 5011 are incident on the redirection assembly 508 and positions of the optical spots generated after the plurality of second sub-beams 5012 are incident on the redirection assembly 508 are described below.

Still refer to FIG. 8. The optical spots of the first sub-beams 5011 are arranged in a first region 801 shown in FIG. 8, and the optical spots of the second sub-beams 5012 are arranged in a second region 802 shown in FIG. 8. In addition, the first region 801 and the second region 802 shown in this embodiment at least partially overlap in the second direction Y (a case of entire overlapping shown in the figure), and the first region 801 and the second region 802 are at least partially separated in the first direction X (a case of entire separation shown in the figure).

Specifically, first optical spots generated by the first beam 501 and second optical spots generated by the second beam 502 are used as examples for description. The first optical spots are a plurality of optical spots generated by the first beam 501, the second optical spots are a plurality of optical spots generated by the second beam 502, the first optical spots are arranged in the first region 801, and the second optical spots are arranged in the second region 802.

A plurality of optical spots included in the first optical spots and a plurality of optical spots included in the second optical spots that are shown in this embodiment are in a one-to-one correspondence. Specifically, an arrangement sequence of two optical spots in a one-to-one correspondence in the first optical spots is the same as an arrangement sequence in the second optical spots. The two optical spots in a one-to-one correspondence are specifically described below.

Wavelengths of the plurality of first sub-beams are separately $\lambda_{c-1}$, $\lambda_{c-2}$, . . . , and $\lambda_{c-N}$, and wavelength values of $\lambda_{c-1}$, $\lambda_{c-2}$, . . . , and $\lambda_{c-N}$ are mutually different; and wavelengths of the plurality of second sub-beams are separately $\lambda_{L-1}$, $\lambda_{L-2}$, . . . , and $\lambda_{L-N}$, and wavelength values of $\lambda_{L-1}$, $\lambda_{L-2}$, . . . , and $\lambda_{L-N}$ are mutually different.

For example, an optical spot included in the first optical spots is an optical spot that is generated after a first sub-beam whose wavelength is $\lambda_{c-1}$ is incident on the redirection assembly 508, and an optical spot included in the second optical spots is an optical spot that is generated after a second sub-beam whose wavelength is $\lambda_{L-1}$ is incident on the redirection assembly 508. The optical spot with the wavelength $\lambda_{c-1}$ ranks first in the first optical spots, and the optical spot with the wavelength $\lambda_{L-1}$ ranks first in the second optical spots. It can be learned that the two optical spots are two optical spots in a one-to-one correspondence. For example, an optical spot included in the first optical spots is an optical spot that is generated after a first sub-beam whose wavelength is $\lambda_{c-N}$ is incident on the redirection assembly 508, and an optical spot included in the second optical spots is an optical spot that is generated after a second sub-beam whose wavelength is $\lambda_{L-N}$ is incident on the redirection assembly 508. The optical spot with the wavelength $\lambda_{c-N}$ ranks $N^{th}$ in the first optical spots, and the optical spot with the wavelength $\lambda_{L-N}$ ranks $N^{th}$ in the second optical spots. A specific value of N is not limited in this embodiment provided that N is a positive integer that is greater than or equal to 1.

In the first direction X, two optical spots in a one-to-one correspondence are disposed at separated positions, and a target distance between the two optical spots in a one-to-one correspondence is related to a value of the focal length of the first lens assembly 507. Specifically, a larger focal length of the first lens assembly 507 leads to a larger target distance, and a smaller focal length of the first lens assembly 507 leads to a smaller target distance.

In the second direction Y, two optical spots in a one-to-one correspondence at least partially overlap. In this embodiment, as an example for description, two optical spots in a one-to-one correspondence at least partially overlap in the second direction Y.

When optical spots generated by the first beam 501 and the second beam 502 are arranged in a manner shown in FIG. 8, filtering bandwidth of the C-band and filtering bandwidth of the L-band can be effectively improved.

The redirection assembly 508 is configured to deflect a propagation direction of each first sub-beam 5011, and after the propagation direction of each first sub-beam 5011 is deflected by the redirection assembly 508, the first sub-beam 5011 is propagated to the first lens assembly 507. After a propagation direction of each second sub-beam 5012 is deflected by the redirection assembly 508, the second sub-beam 5012 is propagated to the first lens assembly 507. In this embodiment, an angle at which each sub-beam exits the redirection assembly 508 in the first direction is not limited. For example, as shown in FIG. 5, a propagation direction of the first sub-beam 5011 is deflected by the redirection assembly 508, the first sub-beam 5011 is emitted at two angles of emergence (that is, as shown by two dashed-line parts in which the first sub-beam is emitted after the propagation direction of the first beam is deflected by the redirection assembly 508). In another example, after the propagation direction of the first sub-beam 5011 is deflected by the redirection assembly 508, the first sub-beam 5011 may be emitted at a specific angle of emergence, or may be emitted at two or more angles of emergence.

The first lens assembly 507 is configured to separately focus the first sub-beam 5011 and the second sub-beam 5012 to the dispersion assembly 506. The dispersion assembly 506 is configured to combine the plurality of first sub-beams 5011 to generate a first output beam. As shown in FIG. 5, the dispersion assembly 506 generates two first output beams, namely, a first output beam 511 and a first output beam 512, based on the plurality of first sub-beams 5011. The dispersion assembly 506 is further configured to combine the plurality of second sub-beams 5012 to generate a second output beam. FIG. 5 is still used as an example. The dispersion assembly 506 generates two second output beams, namely, a second output beam 513 and a second output beam 514, based on the plurality of second sub-beams 5012.

The third lens assembly 505 is configured to couple the first output beam 511 and the first output beam 512 from the dispersion assembly 506 to the first lens 503 included in the second lens assembly, and the third lens assembly 505 is further configured to couple the second output beam 513 and the second output beam 514 from the dispersion assembly 506 to the second lens 504 included in the second lens assembly.

The first lens 503 is configured to adjust an optical propagation path of the first output beam 511 to propagate the first output beam 511 to the collimating lens 415, and the first output beam collimated by the collimating lens 415 is output through the output port 412. The first lens 503 is further configured to adjust an optical propagation path of the first output beam 512 to propagate the first output beam 512 to the collimating lens 413, and the first output beam 512 collimated by the collimating lens 413 is output through the output port 411. For descriptions of transmission processes of the second output beam 513 and the second output beam 514, refer to descriptions of transmission processes of the first output beam 511 and the first output beam 512. Details are not described again.

As shown in FIG. 3, first output beams output from the output ports 411 and 412 of the WSS 1 may be propagated to the WSS 4 by using optical fibers, and second output beams output from the output ports 421 and 422 of the WSS 1 may also be propagated to the WSS 4 by using optical fibers, to implement optical switching of the first beam and the second beam. As shown in this embodiment, a quantity of sub-beams output by each output port is not limited. For example, the output port 421 may propagate one or more first sub-beams to the WSS 4 by using an optical fiber.

In this embodiment, as an example for description, the optical switching apparatus outputs the first output beam through two output ports (that is, the output ports 411 and 412). This is not limited. In another example, the optical switching apparatus may alternatively include another quantity of output ports.

In this embodiment, to effectively improve filtering bandwidth, in the second direction Y, a difference between a first angle of emergence $\beta_c$ at which each first sub-beam exits the dispersion assembly 506 and a second angle of emergence $\beta_L$ at which each second sub-beam exits the dispersion assembly 506 needs to fall within a preset range, so that arrangement of optical spots of each first sub-beam 5011 and each second sub-beam 5012 is shown in FIG. 8. A size of the preset range is not limited in this embodiment, provided that $\beta_c$ is equal to or approximately equal to $\beta_L$. In this embodiment, as an example for description, $\beta_c$ is equal to $\beta_L$.

A manner of adjusting $\beta_c$ and $\beta_L$ to be equal is described below.

Adjustment Manner 1:

Specifically, $\beta_c$ may be adjusted by using the following formula 1, $\beta_L$ is adjusted by using the following formula 2, and the formula 1 and the formula 2 are adjusted to enable $\beta_c$ and $\beta_L$ to be equal.

The formula 1 is $d \cos \theta_c (\sin \alpha_c + \sin \beta_c) = m\lambda_c$, and the formula 2 is $d \cos \theta_L (\sin \alpha_L + \sin \beta_L) = m\lambda_L$.

Specifically, a parameter d in the formula 1 and the formula 2 is a distance between two grating grooves in the dispersion assembly 506, and m is a diffraction order of a grating and is a constant. For specific descriptions of $\alpha_c$ and $\beta_c$ in the formula 1 and specific descriptions of $\alpha_L$ and $\beta_L$ in the formula 2, refer to the foregoing descriptions. Details are not described again. $\lambda_c$ in the formula 1 is a wavelength of one first sub-beam, and $\lambda_L$ in the formula 2 is a wavelength of one second sub-beam.

To enable $\beta_c = \beta_L$, a formula 3 is derived based on the formula 1 and the formula 2, and the formula 3 is shown as follows:

$$\arcsin\left(\frac{m\lambda_c}{d\cos\theta_c} - \sin\alpha_c\right) = \arcsin\left(\frac{m\lambda_L}{d\cos\theta_L} - \sin\alpha_L\right).$$

It can be learned from the foregoing descriptions that values of $\lambda_c$ and $\lambda_L$ are different. Because the positions of the input port 410 and the input port 420 in the second direction Y at least partially overlap, $\alpha_c$ is equal to or approximately equal to $\alpha_L$. In this example, $\alpha_c$ is equal to $\alpha_L$. It can be learned from the formula 3 that $\beta_c = \beta_L$ is implemented by adjusting values of $\theta_c$ and $\theta_L$. $\theta_c$ and $\theta_L$ are described below.

Figure 10:
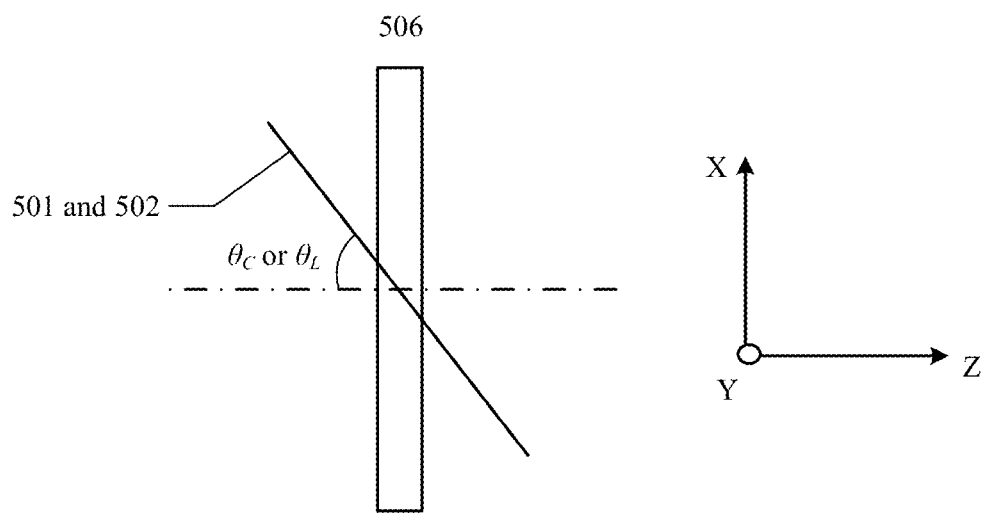
FIG. 10 is another schematic diagram of dispersion of a beam by a dispersion assembly according to this application.

As shown in FIG. 5 and FIG. 10, in the first direction X, the first beam 501 is incident on the dispersion assembly 506 at the first angle of incidence $\theta_c$, and the second beam 502 is incident on the dispersion assembly 506 at the second angle of incidence $\theta_L$. In this embodiment, a difference between absolute values of the first angle of incidence $\theta_c$ and the second angle of incidence $\theta_L$ is not zero.

It can be learned that, in this embodiment, $\beta_c$ and $\beta_L$ are made equal in the second direction by adjusting the first angle of incidence $\theta_c$ at which the first beam 501 is incident on the dispersion assembly 506 and the second angle of incidence $\theta_L$ at which the second beam 502 is incident on the dispersion assembly 506 in the first direction X.

Adjustment Manner 2:

In the adjustment manner 1, for example, if the positions of the input port 410 and the input port 420 in the second direction Y overlap, $\alpha_c$ is equal to $\alpha_L$. In this adjustment manner, descriptions are provided by using a manner of enabling $\beta_c$ and $\beta_L$ to be equal when the positions of the input port 410 and the input port 420 in the second direction Y do not overlap to enable $\alpha_c$ and $\alpha_L$ to be unequal.

For this adjustment manner, further refer to the formula 3. In other words, $\beta_c = \beta_L$ is implemented by adjusting values of $\alpha_c$, $\alpha_L$, $\theta_c$, and $\theta_L$ in the formula 3. For descriptions of $\theta_c$ and $\theta_L$, refer to the adjustment manner 1. Details are not described again.

A manner of adjusting the first angle of incidence $\theta_c$ and the second angle of incidence $\theta_L$ is described below.

The first angle of incidence $\theta_c$ and/or the second angle of incidence $\theta_L$ shown in this embodiment depend/depends on a position of the third lens assembly.

In the first direction X, a larger distance between the input port 410 and a primary optical axis of the third lens assembly 505 leads to a larger first angle of incidence $\theta_c$, and a smaller distance between the input port 410 and the primary optical axis of the third lens assembly 505 leads to a smaller first angle of incidence $\theta_c$.

Similarly, in the first direction X, a larger distance between the input port 420 and the primary optical axis of the third lens assembly 505 leads to a larger second angle of incidence $\theta_L$, and a smaller distance between the input port 420 and the primary optical axis of the third lens assembly 505 leads to a smaller second angle of incidence $\theta_L$.

Beneficial effects achieved after the optical switching apparatus shown in this embodiment is used are as follows: An angle at which a beam is incident on the dispersion assembly in the second direction is adjusted without a need to add an optical component (for example, an AWG), but a value of an angle at which a beam is incident on the dispersion assembly in the first direction is adjusted, to effectively ensure that an angle at which the first beam exits the dispersion assembly in the second direction is equal to or approximately equal to an angle at which the second beam exits the dispersion assembly in the second direction. In this way, insertion loss caused by adding of the optical component (for example, an AWG) is reduced as much as possible while filtering bandwidth of the optical switching apparatus is effectively improved, and in addition, the angle at which the first beam is incident on the dispersion assembly is equal to or approximately equal to the angle at which the second beam is incident on the dispersion assembly, so that a structure of the optical switching apparatus in the second direction is more compact.

Embodiment 2

In Embodiment 1, beams on different bands are input into an optical switching apparatus through different input ports. In Embodiment 2, if beams on different bands are propagated in a same optical fiber, how the optical switching apparatus shown in this embodiment implements optical switching is described.

Figure 11:
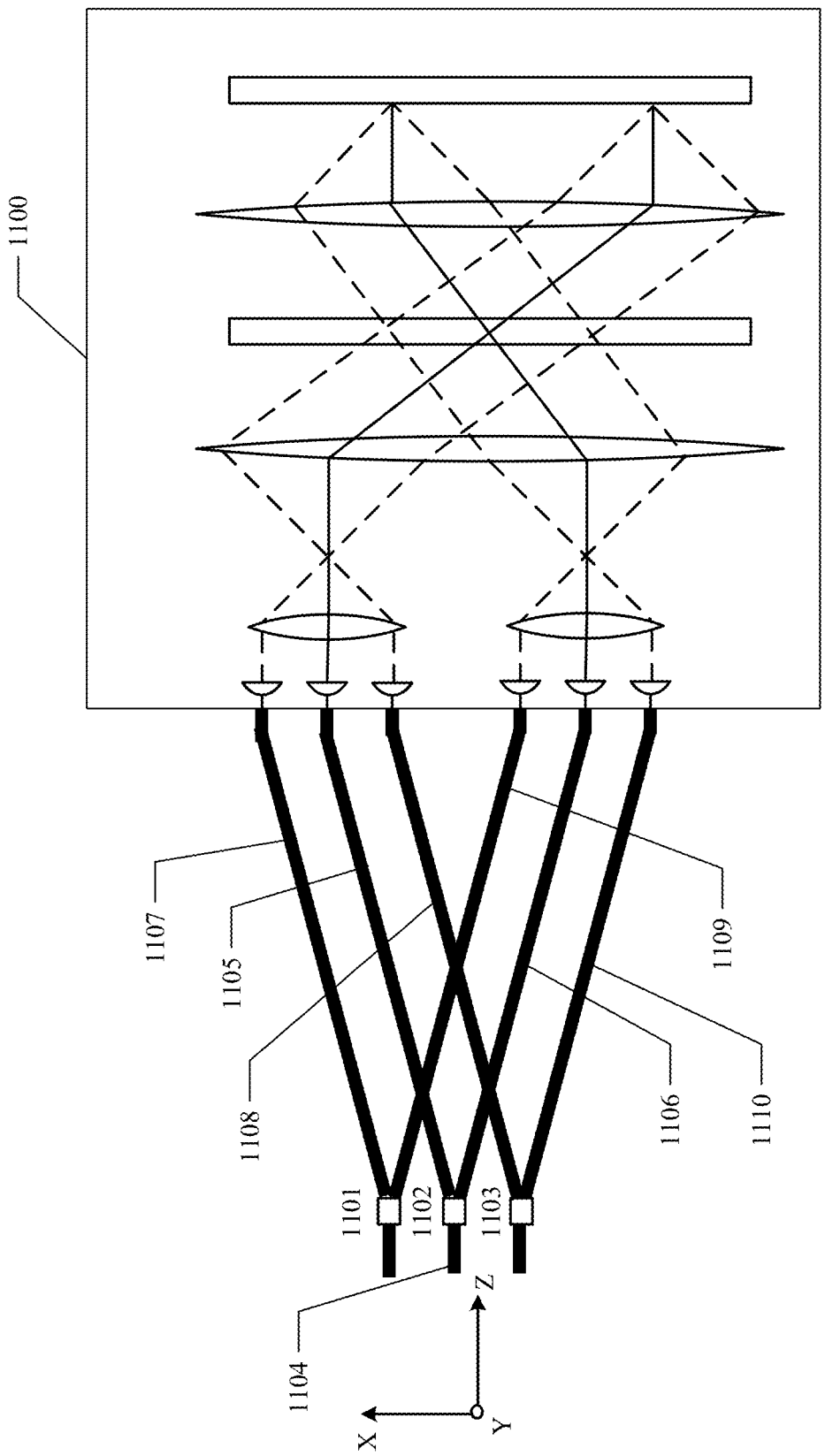
FIG. 11 is a schematic diagram of another structure of an optical switching apparatus in a first direction according to this application.

The optical switching apparatus shown in this embodiment is shown in FIG. 11. In a first direction X, the optical switching apparatus includes one or more filters and a WSS, and the filter and the WSS are connected by using an optical fiber. In this embodiment, as an example for description, the optical switching apparatus is configured to perform optical switching on a first beam (a C-band) and a second beam (an L-band). For specific descriptions of the first beam and the second beam, refer to Embodiment 1. Details are not described again.

In this embodiment, as an example for description, three filters (that is, a filter 1101, a filter 1102, and a filter 1103) are included. The filter 1102 is configured to separate an optical signal from an optical fiber 1104 to generate the first beam and the second beam. The filter 1102 is further configured to: propagate the first beam to a WSS 1100 by using an optical fiber 1105, and propagate the second beam to the WSS 1100 by using an optical fiber 1106. For descriptions of a specific structure of the WSS 1100 and specific descriptions of performing optical switching on the first beam and the second beam, refer to Embodiment 1. Details are not described again.

Two first output beams generated by the WSS 1100 are respectively propagated to the filter 1101 and the filter 1103 by using an optical fiber 1107 and an optical fiber 1108. Two second output beams generated by the WSS 1100 are respectively propagated to the filter 1101 and the filter 1103 by using an optical fiber 1109 and an optical fiber 1110. For descriptions of the first output beam and the second output beam, refer to Embodiment 1. Details are not described again.

With reference to FIG. 3, if the WSS 1100 shown in this embodiment is the WSS 1 shown in FIG. 3, the filter 1101 may combine the two first output beams and propagate a combined optical signal to the WSS 4 by using an optical fiber, or the filter 1103 may combine the two second output beams and propagate a combined optical signal to the WSS 4 by using an optical fiber, to implement optical switching of the optical signal.

The filters shown in this embodiment and the optical fibers in a connection relationship with the filters may alternatively be replaced with a spatial optical assembly, a film-coated assembly, or the like.

For beneficial effects achieved after the optical switching apparatus shown in this embodiment is used, refer to Embodiment 1. Details are not described again. In addition, in the optical switching apparatus shown in this embodiment, a quantity of input ports and a quantity of output ports can be effectively reduced by using the filter.

Embodiment 3

Figure 12:
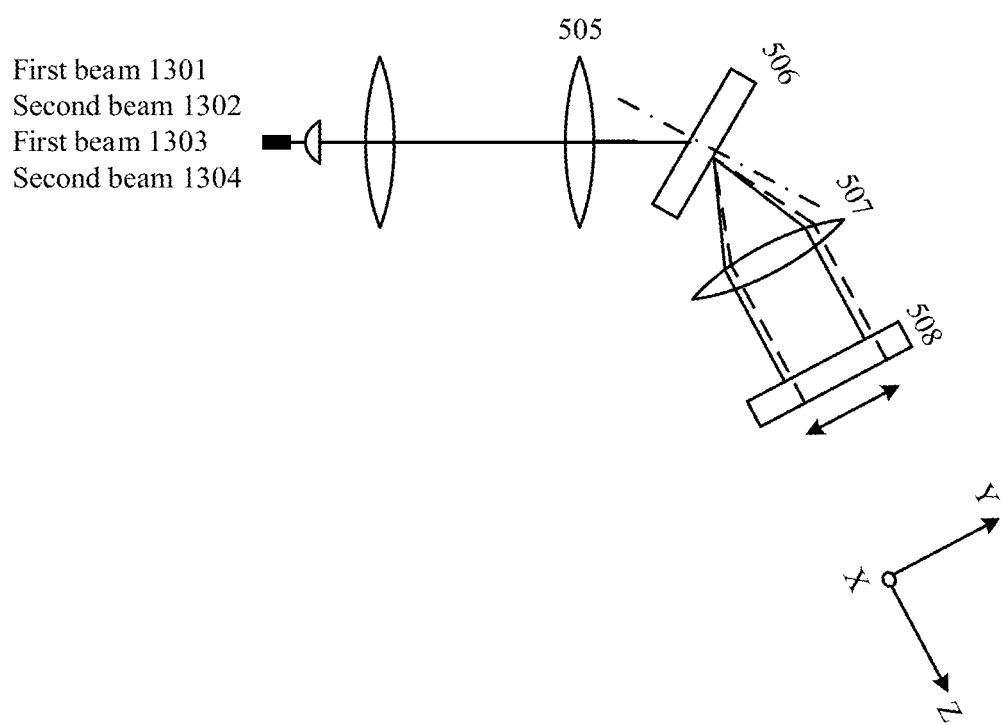
FIG. 12 is a schematic diagram of another structure of an optical switching apparatus in a second direction according to this application.
Figure 13:
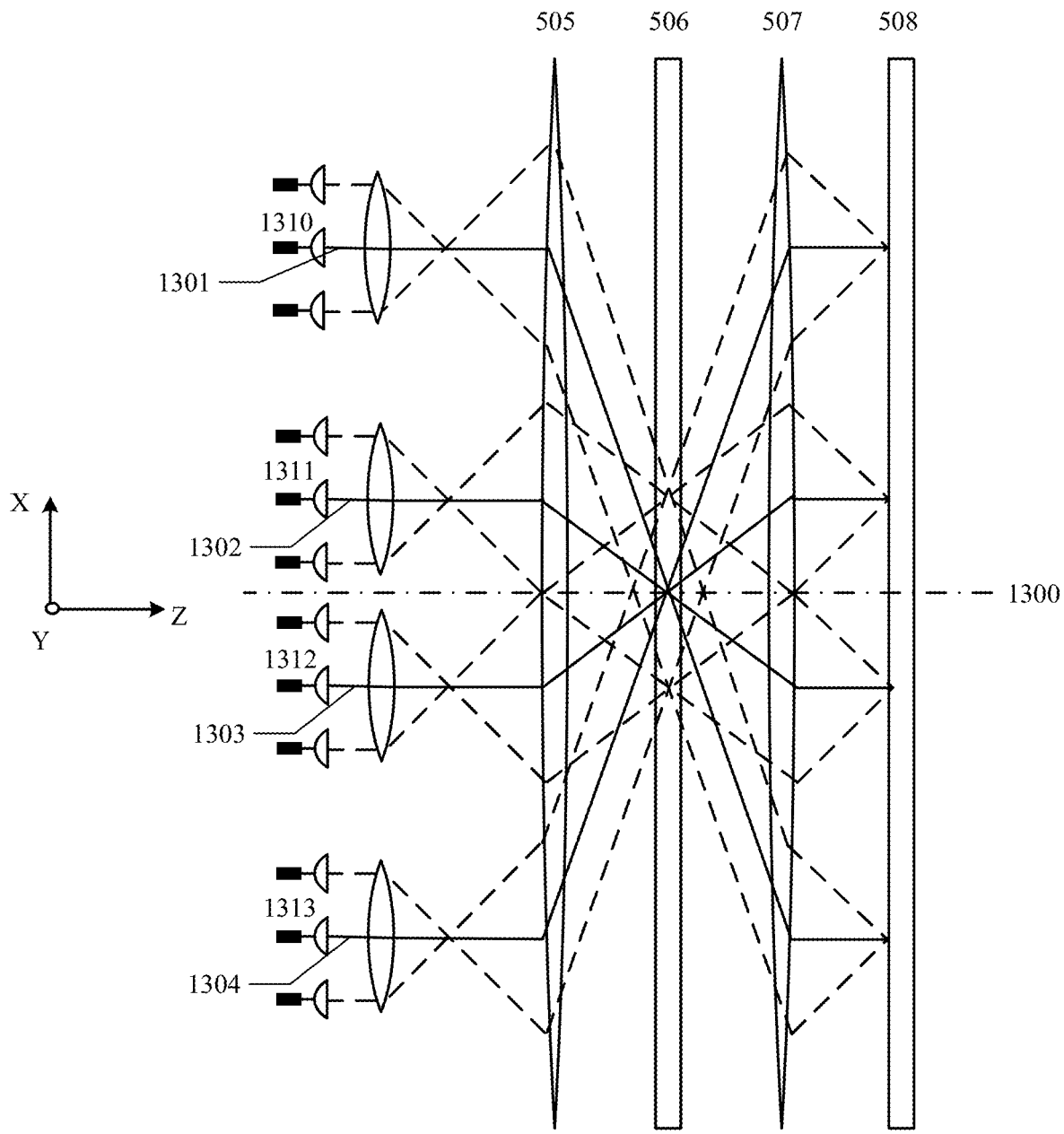
FIG. 13 is a schematic diagram of another structure of an optical switching apparatus in a first direction according to this application.

In Embodiment 1, as an example for description, the optical switching apparatus is a WSS. In this embodiment, as an example for description, the optical switching apparatus includes two or more WSSs. In this embodiment, a quantity of WSSs included in the optical switching apparatus is not limited. That the optical switching apparatus includes two WSSs is used as an example for description below. The two WSSs included in the optical switching apparatus shown in this embodiment may be the WSS 1 and the WSS 2 shown in FIG. 3. A specific structure is described as follows:

FIG. 12 is a schematic diagram of a structure of the optical switching apparatus in a second direction. FIG. 13 is a schematic diagram of a structure of the optical switching apparatus in a first direction. For descriptions of the first direction and the second direction, refer to Embodiment 1. Details are not described again.

In this embodiment, the WSS 1 is configured to perform optical switching on a first beam 1301 and a second beam 1302, and the WSS 2 is configured to perform optical switching on a first beam 1303 and a second beam 1304. Both the first beam 1301 and the first beam 1303 are C-band beams, and both the second beam 1302 and the second beam 1304 are L-band beams. For descriptions of the input port, the output port, the collimating lens array, and the second lens assembly that are included in the WSS 1 and the WSS 2 shown in this embodiment, refer to Embodiment 1. Details are not described again in this embodiment.

An input port 1310 of the WSS 1 is configured to input the first beam 1301, an input port 1311 is configured to input the second beam 1302, an input port 1312 of the WSS 2 is configured to input the first beam 1303, and an input port 1313 is configured to input the second beam 1304.

As shown in FIG. 12, in a second direction Y, the input ports 1310 and 1311 of the WSS 1 and the input ports 1312 and 1313 of the WSS 2 at least partially overlap. FIG. 12 shows an example in which the input port 1310 and the input port 1312 entirely overlap and the input port 1311 and the input port 1313 entirely overlap. As shown in FIG. 13, in a first direction X, the input port 1310, the input port 1311, the input port 1312, and the input port 1313 are located at separated positions, and the input port 1310, the input port 1311, the input port 1312, and the input port 1313 are disposed in parallel in the first direction X. In another example, in the second direction Y, the input ports 1310 and 1311 of the WSS 1 and the input ports 1312 and 1313 of the WSS 2 may be located at entirely separated positions.

The input port 1310 is configured to input the first beam 1301 into a dispersion assembly 506 at a third angle of incidence $\alpha_{c1}$ in the second direction Y, and the input port 1311 is further configured to input the second beam 1302 into the dispersion assembly 506 at a fourth angle of incidence $\alpha_{L1}$ in the second direction Y. For descriptions of the dispersion assembly 506, refer to Embodiment 1. Details are not described again. The input port 1312 is configured to input the first beam 1303 into the dispersion assembly 506 at a third angle of incidence $\alpha_{c2}$ in the second direction Y, and the input port 1313 is configured to input the second beam 1304 into the dispersion assembly 506 at a fourth angle of incidence $\alpha_{L2}$ in the second direction Y.

When positions of the input port 1310, the input port 1311, the input port 1312, and the input port 1313 in the second direction at least partially overlap, a difference between any two angles in the third angle of incidence $\alpha_{c1}$, the fourth angle of incidence $\alpha_{L1}$, the third angle of incidence $\alpha_{c2}$, and the fourth angle of incidence $\alpha_{L2}$ falls within a preset range, so that the four angles ($\alpha_{c1}$, $\alpha_{L1}$, $\alpha_{c2}$, and $\alpha_{L2}$) are equal or approximately equal. For specific descriptions, refer to the descriptions of the third angle of incidence $\alpha_c$ and the fourth angle of incidence $\alpha_L$ in Embodiment 1. Details are not described again.

As shown in this embodiment, the WSS 1 and the WSS 2 share some optical components. As shown in FIG. 12 and FIG. 13, the optical components shared by the WSS 1 and the WSS 2 are a third lens assembly 505, the dispersion assembly 506, a first lens assembly 507, and a redirection assembly 508. For specific descriptions of the third lens assembly 505, the dispersion assembly 506, the first lens assembly 507, and the redirection assembly 508, refer to Embodiment 1. Details are not described again.

Figure 14:
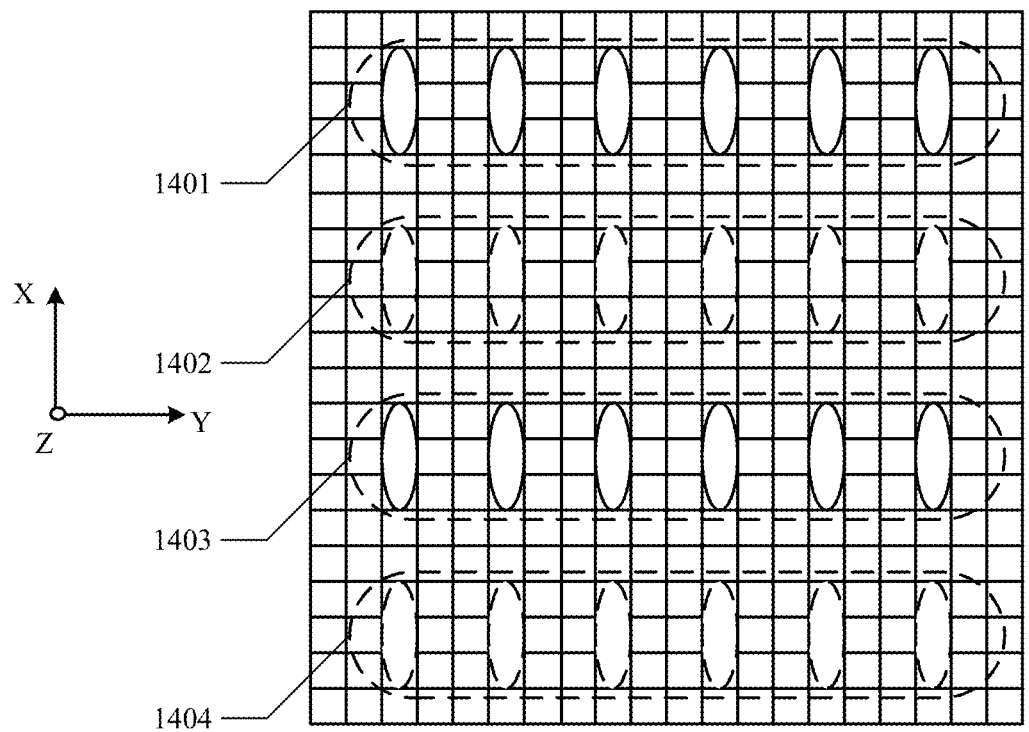
FIG. 14 is another schematic diagram of arrangement of optical spots on a redirection assembly according to this application.

In this embodiment, arrangement of optical spots generated by the first beam 1301, the second beam 1302, the first beam 1303, and the second beam 1304 on the redirection assembly 508 is shown in FIG. 14. A plurality of optical spots generated by the first beam 1301 are arranged in a first region 1401, a plurality of optical spots generated by the second beam 1302 are arranged in a second region 1402, a plurality of optical spots generated by the first beam 1303 are arranged in a third region 1403, and a plurality of optical spots generated by the second beam 1304 are arranged in a fourth region 1404.

The first region 1401, the second region 1402, the third region 1403, and the fourth region 1404 shown in this embodiment at least partially overlap in the second direction Y, and as shown in FIG. 14, the first region 1401, the second region 1402, the third region 1403, and the fourth region 1404 entirely overlap in the second direction Y. The first region 1401, the second region 1402, the third region 1403, and the fourth region 1404 are at least partially separated in the first direction X, and in FIG. 14, the first region 1401, the second region 1402, the third region 1403, and the fourth region 1404 are entirely separated in the first direction X. For specific descriptions, refer to FIG. 8. Details are not described again. When arrangement of the optical spots generated by the first beam 1301, the second beam 1302, the first beam 1303, and the second beam 1304 are shown in FIG. 14, filtering bandwidth of a C-band and filtering bandwidth of an L-band can be effectively improved.

An output port of the WSS 1 and an output port of the WSS 2 are configured to receive output beams. For specific descriptions, refer to Embodiment 1. Details are not described again.

In this embodiment, to effectively improve filtering bandwidth, in the second direction Y, a difference between any two angles in a first angle of emergence $\beta_{c1}$ at which each sub-beam of the first beam 1301 exits the dispersion assembly 506, a second angle of emergence $\beta_{L1}$ at which each sub-beam of the second beam 1302 exits the dispersion assembly 506, a third angle of emergence $\beta_{c2}$ at which each sub-beam of the first beam 1303 exits the dispersion assembly 506, and a fourth angle of emergence $\beta_{L2}$ at which each sub-beam of the second beam 1304 exits the dispersion assembly 506 falls within a preset range, so that the four angles $\beta_{c1}$, $\beta_{L1}$, $\beta_{c2}$, and $\beta_{L2}$ are equal or approximately equal. In this embodiment, as an example for description, $\beta_{c1}$, $\beta_{L1}$, $\beta_{c2}$, and $\beta_{L2}$ are equal. A manner of adjusting $\beta_{c1}$, $\beta_{L1}$, $\beta_{c2}$, and $\beta_{L2}$ to be equal is described below.

Specifically, $\beta_{c1}$ may be adjusted by using a formula 4, $\beta_{L1}$ may be adjusted by using a formula 5, $\beta_{c2}$ may be adjusted by using a formula 6, and $\beta_{L2}$ may be adjusted by using a formula 7, so that $\beta_{c1}$, $\beta_{L1}$, $\beta_{c2}$, and $\beta_{L2}$ are equal.

The formula 4 is d cos $\theta_{c1}$(sin $\alpha_{c1}$+sin $\beta_{c1}$)=m$\lambda_{c1}$, the formula 5 is d cos $\theta_{L1}$(sin $\alpha_{L1}$+sin $\beta_{L1}$)=m$\lambda_{L1}$, the formula 6 is d cos $\theta_{c2}$(sin $\alpha_{c2}$+sin $\beta_{c2}$)=m$\lambda_{c2}$, and the formula 7 is d cos $\theta_{L2}$(sin $\alpha_{L2}$+sin $\beta_{L2}$)=m$\lambda_{L2}$.

For specific descriptions of parameters d and m in the formulas, refer to Embodiment 1. For specific descriptions of $\alpha_{c1}$, $\alpha_{L1}$, $\alpha_{c2}$, and $\alpha_{L2}$ and specific descriptions of $\beta_{c1}$, $\beta_{L1}$, $\beta_{c2}$, and $\beta_{L2}$, refer to the foregoing descriptions. Details are not described again. $\lambda_{c1}$ is a wavelength of one sub-beam in the first beam 1301, $\lambda_{L1}$ is a wavelength of one sub-beam in the second beam 1302, $\lambda_{c2}$ is a wavelength of one sub-beam in the first beam 1303, and $\lambda_{L2}$ is a wavelength of one sub-beam in the second beam 1304.

To enable $\beta_{c1}$, $\beta_{L1}$, $\beta_{c2}$, and $\beta_{L2}$ to be equal, the formula 8 is derived based on the formula 4 to the formula 6, and the formula 8 is shown as follows:

$$\arcsin\left(\frac{m\lambda_{C1}}{d\cos\theta_{C1}} - \sin a_{c1}\right) = \arcsin\left(\frac{m\lambda_{L1}}{d\cos\theta_{L1}} - \sin a_{L1}\right) =$$
$$\arcsin\left(\frac{m\lambda_{C2}}{d\cos\theta_{C2}} - \sin a_{c2}\right) = \arcsin\left(\frac{m\lambda_{L2}}{d\cos\theta_{L2}} - \sin a_{L2}\right).$$

It can be learned from the foregoing descriptions that $\lambda_{c1}$ is equal to $\lambda_{c2}$, $\lambda_{L1}$ is equal to $\lambda_{L2}$, $\lambda_{c1}$ is unequal to $\lambda_{L1}$, and $\lambda_{C2}$ is unequal to $\lambda_{L2}$. In this example, $\alpha_{c1}$, $\alpha_{L1}$, $\alpha_{c2}$, and $\alpha_{L2}$ are equal. It can be learned from the formula 8 that, $\beta_{c1}$, $\beta_{L1}$, $\beta_{c2}$, and $\beta_{L2}$ may be enabled to be equal by adjusting values of $\theta_{c1}$, $\theta_{L1}$, $\theta_{c2}$, and $\theta_{L2}$. If $\alpha_{c1}$, $\alpha_{L1}$, $\alpha_{c2}$, and $\alpha_{L2}$ are unequal in another example, $\beta_{c1}$, $\beta_{L1}$, $\beta_{c2}$, and $\beta_{L2}$ may be enabled to be equal by adjusting values of $\alpha_{c1}$, $\alpha_{L1}$, $\alpha_{c2}$, $\alpha_{L2}$, $\theta_{c1}$, $\theta_{L1}$, $\theta_{c2}$, and $\theta_{L2}$. $\theta_{c1}$, $\theta_{L1}$, $\theta_{c2}$, and $\theta_{L2}$ are described below.

As shown in FIG. 12 and FIG. 13, in the first direction X, the first beam 1301 is incident on the dispersion assembly 506 at the first angle of incidence $\theta_{c1}$, the second beam 1302 is incident on the dispersion assembly 506 at the second angle of incidence $\theta_{L1}$, the first beam 1303 is incident on the dispersion assembly 506 at the first angle of incidence $\theta_{c2}$, and the second beam 1304 is incident on the dispersion assembly 506 at the second angle of incidence $\theta_{L2}$. A difference between absolute values of $\theta_{c1}$ and $\theta_{L1}$ is not zero, and a difference between absolute values of $\theta_{c2}$ and $\theta_{L2}$ is not zero.

In this embodiment, for specific descriptions of a manner of adjusting values of $\theta_{c1}$, $\theta_{L1}$, $\theta_{c2}$, and $\theta_{L2}$, refer to the manner of adjusting $\theta_c$ and $\theta_L$ in Embodiment 1. Details are not described again.

Optionally, when $\lambda_{c1}$ and $\lambda_{c2}$ are equal or approximately equal, to avoid a case in which positions of an optical spot of the first beam 1301 and an optical spot of the first beam 1303 on the redirection assembly 508 overlap in the first direction X, that is, to avoid a case in which the first region 1401 and the third region 1403 shown in FIG. 14 overlap in the first direction X, the first angle of incidence $\theta_{c1}$ and the first angle of incidence $\theta_{c2}$ are symmetrical with respect to a primary optical axis 1300, so that $\theta_{c1}$=−$\theta_{c2}$ and $|\theta_{C1}|=|\theta_{C2}|$. The primary optical axis 1300 may be a primary optical axis of the third lens assembly 505, or may be a primary optical axis of the first lens assembly 507.

With reference to the formula 7, when $\theta_{c1}$ and $\theta_{c2}$ are symmetrical with respect to the primary optical axis 1300, absolute values of $\theta_{c1}$ and $\theta_{c2}$ are equal or approximately equal, and cos $\theta_{c1}$ is equal to cos(−$\theta_{c1}$). In this way, it is effectively ensured that $\beta_{c1}$ and $\beta_{c2}$ are equal.

Optionally, when $\lambda_{L1}$ and $\lambda_{L2}$ are equal or approximately equal, to avoid a case in which positions of an optical spot of the second beam 1302 and an optical spot of the second beam 1304 on the redirection assembly 508 overlap in the first direction X, that is, to avoid a case in which the second region 1402 and the fourth region 1404 shown in FIG. 14 overlap in the first direction X, the second angle of incidence $\theta_{L1}$ and the second angle of incidence $\theta_{L2}$ are symmetrical with respect to the primary optical axis 1300.

With reference to the formula 7, when $\theta_{L1}$ and $\theta_{L2}$ are symmetrical with respect to the primary optical axis 1300, $\theta_{L1}$ and $\theta_{L2}$ are equal or approximately equal, and cos $\theta_{L1}$ is equal to cos($-\theta_{L1}$). In this way, it is effectively ensured that $\beta_{L1}$ and $\beta_{L2}$ are equal.

For beneficial effects achieved after the optical switching apparatus shown in this embodiment is used, refer to Embodiment 1. Details are not described again. In addition, the optical switching apparatus shown in this embodiment includes a plurality of WSSs, so that a larger switching capacity is effectively implemented.

Embodiment 4

Figure 15:
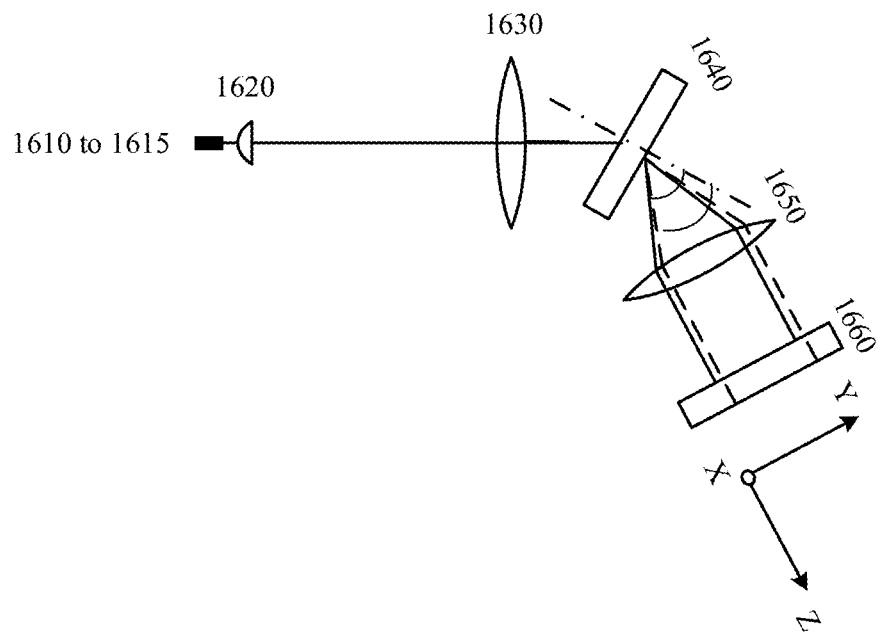
FIG. 15 is a schematic diagram of another structure of an optical switching apparatus in a second direction according to this application.
Figure 16:
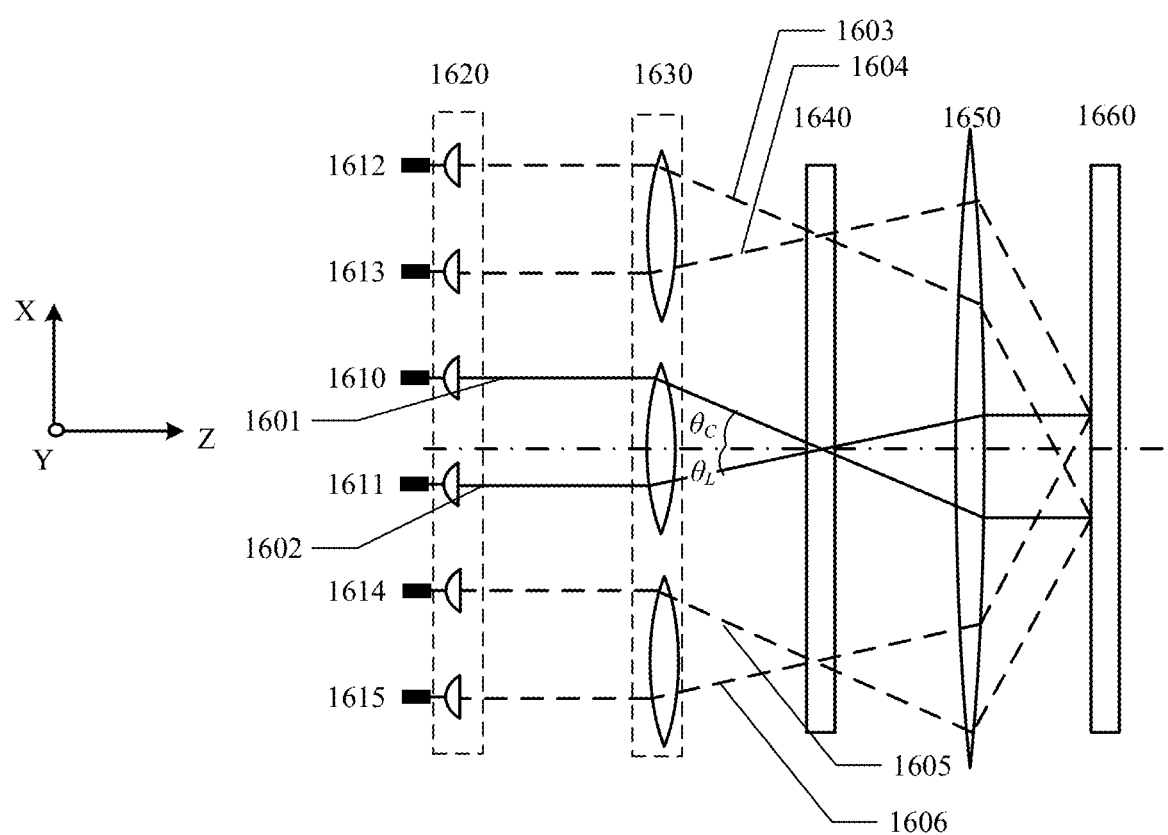
FIG. 16 is a schematic diagram of another structure of an optical switching apparatus in a first direction according to this application.

In the foregoing embodiment, related ports (the input port 410, the output port 411, and the output port 412 shown in FIG. 5) configured to propagate the first beam are disposed at adjacent positions, related ports (the input port 420, the output port 421, and the output port 422 shown in FIG. 5) configured to propagate the second beam are disposed at adjacent positions, and positions of the related ports configured to propagate the first beam and the related ports configured to propagate the second beam are disposed at separated positions. In this embodiment, the positions of the related ports configured to propagate the first beam are spaced apart, and the positions of the related ports configured to propagate the second beam are also spaced apart. For details, refer to FIG. 15 and FIG. 16. FIG. 15 is a schematic diagram of a structure of the optical switching apparatus in the second direction. FIG. 16 is a schematic diagram of a structure of the optical switching apparatus in the first direction. For descriptions of the first direction and the second direction, refer to Embodiment 1. Details are not described again.

In this embodiment, as an example for description, the optical switching apparatus is configured to perform optical switching on a first beam 1601 and a second beam 1602. For specific descriptions of the first beam 1601 and the second beam 1602, refer to Embodiment 1. Details are not described again. Components of the optical switching apparatus are described below.

An input port 1610 included in the optical switching apparatus is configured to input the first beam 1601, an input port 1611 is configured to input the second beam 1602, and the input port 1610 and the input port 1611 shown in this embodiment are disposed adjacent to each other.

This embodiment shows optical switching on the first beam 1601 and the second beam 1602, and the optical switching apparatus includes a collimating lens array 1620, a second lens assembly 1630, a dispersion assembly 1640, a first lens assembly 1650, and a redirection assembly 1660. For specific descriptions of the components, refer to Embodiment 1. Details are not described again.

In this embodiment, a first angle of emergence $\beta_c$ and a second angle of emergence $\theta_L$ are enabled to be equal in a second direction by adjusting a first angle of incidence $\theta_c$ at which the first beam 1601 is incident on the dispersion assembly 1640 in a first direction X and a second angle of incidence $\theta_L$ at which the second beam 1602 is incident on the dispersion assembly 1640 in the first direction X. For a specific adjustment process, refer to Embodiment 1. Details are not described again. For arrangement positions, on the redirection assembly 1660, of optical spots generated by the first beam 1601 and the second beam 1602, refer to Embodiment 1. Details are not described again.

As shown in FIG. 16, a position of an output port 1612 configured to output a first output beam 1603 and a position of an output port 1613 configured to output a second output beam 1604 are adjacent to each other, a position of an output port 1614 configured to output a first output beam 1605 and a position of an output port 1615 configured to output a second output beam 1606 are adjacent to each other, the output port 1612 configured to output the first output beam 1603 and the output port 1614 configured to output the first output beam 1605 are spaced apart, and the output port 1613 configured to output the second output beam 1604 and the output port 1615 configured to output the second output beam 1606 are spaced apart. For descriptions of the first output beam and the second output beam, refer to Embodiment 1. Details are not described again.

For beneficial effects achieved after the optical switching apparatus shown in this embodiment is used, refer to Embodiment 1. Details are not described again. In addition, compared with Embodiment 1, in the optical switching apparatus shown in this embodiment, a quantity of lens assemblies can be effectively reduced.

Embodiment 5

Based on descriptions of the optical switching apparatuses in Embodiment 1 to Embodiment 4, an execution process of a redirection method is described below with reference to Embodiment 5.

Figure 17:
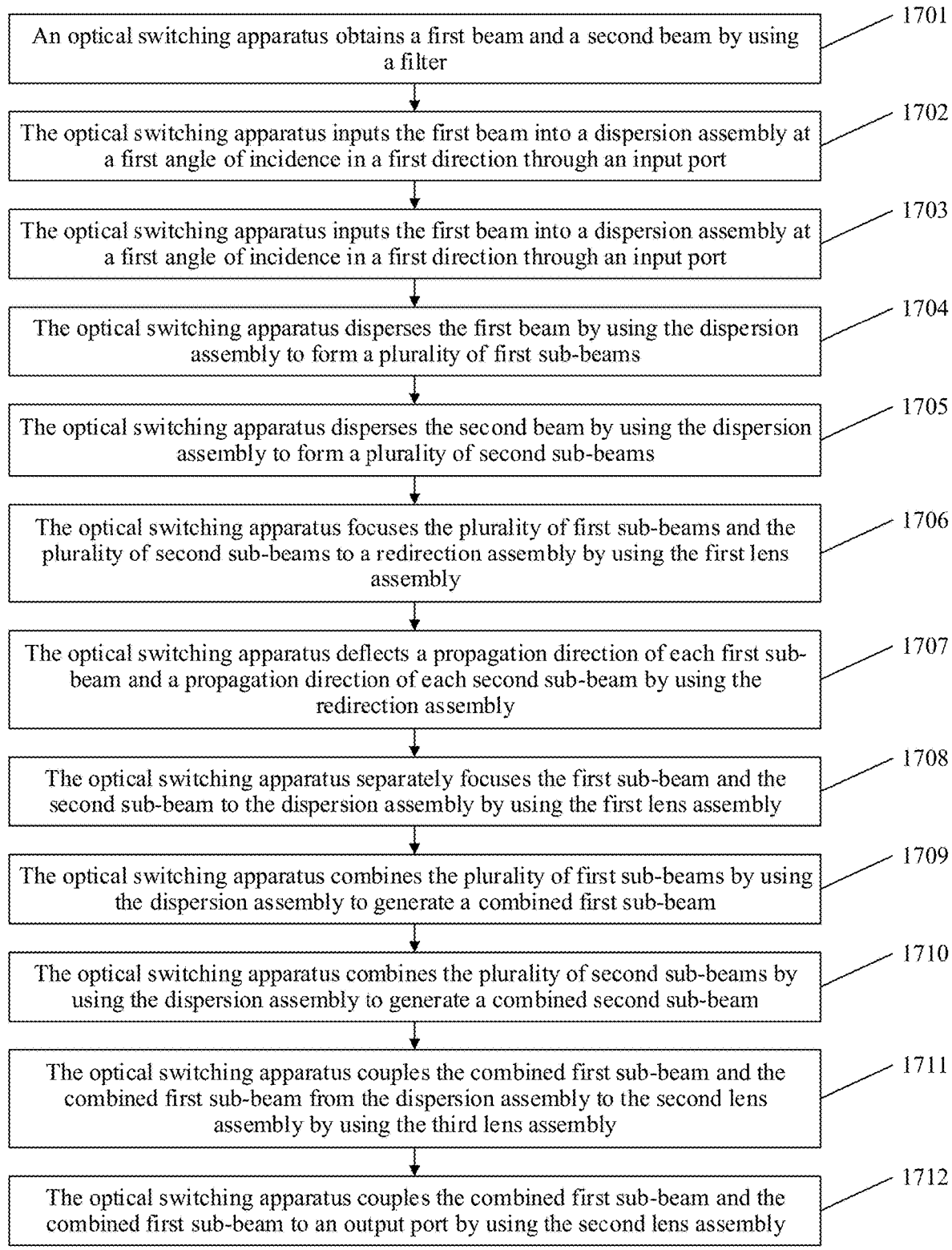
FIG. 17 is a step flowchart of a redirection method according to this application.

Specifically, as shown in FIG. 17, the redirection method shown in this embodiment specifically includes the following steps.

Step 1701: An optical switching apparatus obtains a first beam and a second beam by using a filter.

For a specific process, refer to Embodiment 3. Details are not described again. Step 1701 shown in this embodiment is an optional step. If no filter is disposed in the optical switching apparatus, step 1702 may be directly performed.

Step 1702: The optical switching apparatus inputs the first beam into a dispersion assembly at a first angle of incidence in a first direction through an input port.

Step 1703: The optical switching apparatus inputs the second beam into the dispersion assembly at a second angle of incidence in the first direction through the input port.

Specifically, a second lens assembly and a third lens assembly are further included between the input port and the dispersion assembly, and the first beam and the second beam are sequentially incident on the dispersion assembly through the second lens assembly and the third lens assembly. For descriptions of a specific process, refer to Embodiment 1. Details are not described again.

Step 1704: The optical switching apparatus disperses the first beam by using the dispersion assembly to form a plurality of first sub-beams.

Step 1705: The optical switching apparatus disperses the second beam by using the dispersion assembly to form a plurality of second sub-beams.

Specifically, the optical switching apparatus emits the plurality of first sub-beams at a first angle of emergence in the second direction by using the dispersion assembly, the optical switching apparatus emits the plurality of second sub-beams at a second angle of emergence in the second direction by using the dispersion assembly, and a difference between the first angle of emergence and the second angle of emergence falls within a preset range. For descriptions of a specific execution process, refer to the descriptions of the dispersion assembly in Embodiment 1. Details are not described again.

Step 1706: The optical switching apparatus focuses the plurality of first sub-beams and the plurality of second sub-beams to a redirection assembly by using the first lens assembly.

For descriptions of a specific execution process, refer to the descriptions of the first lens assembly in Embodiment 1. Details are not described again.

Step 1707: The optical switching apparatus deflects a propagation direction of each first sub-beam and a propagation direction of each second sub-beam by using the redirection assembly.

Step 1708: The optical switching apparatus separately focuses the first sub-beam and the second sub-beam to the dispersion assembly by using the first lens assembly.

Step 1709: The optical switching apparatus combines the plurality of first sub-beams by using the dispersion assembly to generate a first output beam.

Step 1710: The optical switching apparatus combines the plurality of second sub-beams by using the dispersion assembly to generate a second output beam.

Step 1711: The optical switching apparatus couples the first output beam and the second output beam from the dispersion assembly to the second lens assembly by using the third lens assembly.

Step 1712: The optical switching apparatus couples the first output beam and the second output beam to an output port by using the second lens assembly.

For a specific execution process of step 1707 to step 1712 shown in this embodiment, refer to Embodiment 1. Details are not described again.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present invention.

What is claimed is:

1. An optical switching apparatus, comprising an input port, a dispersion grating, a first lens assembly, a redirection assembly, and an output port; wherein
   the input port is configured to cooperate with a plurality of lenses to input a first beam into the dispersion grating at a first angle of incidence in a first direction, and input a second beam into the dispersion assembly at a second angle of incidence in the first direction, wherein a difference between absolute values of the first angle of incidence and the second angle of incidence is non-zero;
   the dispersion grating is configured to disperse the first beam to form a plurality of first sub-beams, and the dispersion grating is further configured to disperse the second beam to form a plurality of second sub-beams;
   the first lens assembly is configured to focus the plurality of first sub-beams and the plurality of second sub-beams to the redirection assembly,
   wherein the redirection assembly includes at least one of a liquid crystal array chip, or a micro-electro-mechanical system (MEMS);
   wherein the plurality of first sub-beams are incident on a first region of the redirection assembly, the plurality of second sub-beams are incident on a second region of the redirection assembly,
   wherein the difference between the absolute values of the first angle of incidence and the second angle of incidence enables the first region and the second region to be separated from each other in the first direction, and enables the first region and the second region to at least partially overlap in a second direction,
   wherein the first direction is perpendicular to the second direction, and both the first direction and the second direction are perpendicular to a propagation direction of the first beam; and
   the output port is configured to output the plurality of first sub-beams and the plurality of second sub-beams that are redirected by the redirection assembly;
   wherein the optical switching apparatus further comprises a third lens assembly positioned between the input port and the dispersion assembly, and at least one of the first angle of incidence and the second angle of incidence depends on a position of the third lens assembly; and
   wherein at least one of the first angle of incidence and the second angle of incidence depends on a distance between the input port and a primary optical axis of the third lens assembly.

2. The optical switching apparatus according to claim 1, wherein the first region includes positions at which the plurality of first sub-beams generate first optical spots, the second region includes positions at which the plurality of second sub-beams generate second optical spots, and the first optical spots and the second optical spots at least partially overlap in the second direction.

3. The optical switching apparatus according to claim 2, wherein a plurality of optical spots comprised in the first optical spots are in a one-to-one correspondence with a plurality of optical spots comprised in the second optical spots.

4. The optical switching apparatus according to claim 1, wherein the input port is configured to input the first beam into the dispersion grating at a third angle of incidence in the second direction, the input port is further configured to input the second beam into the dispersion grating at a fourth angle of incidence in the second direction, and
   wherein a difference between the third angle of incidence and the fourth angle of incidence falls within a preset range.

5. The optical switching apparatus according to claim 1, further comprising: a second lens assembly positioned between the input port and the dispersion grating, and the second lens assembly is configured to couple the first beam and the second beam to the dispersion grating.

6. The optical switching apparatus according to claim 1, wherein the dispersion grating is configured to emit the plurality of first sub-beams at a first angle of emergence in the second direction, and is further configured to emit the plurality of second sub-beams at a second angle of emergence in the second direction, and a difference between the first angle of emergence and the second angle of emergence falls within a preset range.

7. The optical switching apparatus according to claim 3, wherein a value of a focal length of the first lens assembly is related to a value of a target distance, and the target distance is a distance between two optical spots in a one-to-one correspondence in the first direction.

8. A redirection method, applied to an optical switching apparatus, which comprises an input port, a dispersion grating, a first lens assembly, a redirection assembly, and an output port, and the method comprises:
  inputting a first beam into the dispersion grating at a first angle of incidence in a first direction by the input port cooperating with a plurality of lenses;
  inputting a second beam into the dispersion grating at a second angle of incidence in the first direction through the input port, wherein a difference between absolute values of the first angle of incidence and the second angle of incidence is non-zero;
  dispersing the first beam by using the dispersion grating to form a plurality of first sub-beams;
  dispersing the second beam by using the dispersion grating to form a plurality of second sub-beams;
  focusing the plurality of first sub-beams and the plurality of second sub-beams to the redirection assembly by using the first lens assembly,
    wherein the redirection assembly includes at least one of a liquid crystal array chip, or a micro-electromechanical system (MEMS);
    wherein the plurality of first sub-beams are incident on a first region of the redirection assembly, the plurality of second sub-beams are incident on a second region of the redirection assembly,
    wherein the difference between the absolute values of the first angle of incidence and the second angle of incidence enables the first region and the second region to be separated from each other in the first direction, and enables the first region and the second region to at least partially overlap in a second direction,
    wherein the first direction is perpendicular to the second direction, and both the first direction and the second direction are perpendicular to a propagation direction of the first beam; and
  outputting, through the output port, the plurality of first sub-beams and the plurality of second sub-beams that are redirected by the redirection assembly;
  wherein the optical switching apparatus further comprises a third lens assembly positioned between the input port and the dispersion assembly, and at least one of the first angle of incidence and the second angle of incidence depends on a position of the third lens assembly; and
  wherein at least one of the first angle of incidence and the second angle of incidence depends on a distance between the input port and a primary optical axis of the third lens assembly.

9. The redirection method according to claim 8, wherein that the first region and the second region at least partially overlap in the second direction comprises:
  the first region includes positions at which the plurality of first sub-beams generate first optical spots, the second region includes positions at which the plurality of second sub-beams generate second optical spots, and the first optical spots and the second optical spots at least partially overlap in the second direction.

10. The redirection method according to claim 9, wherein a plurality of optical spots comprised in the first optical spots are in a one-to-one correspondence with a plurality of optical spots comprised in the second optical spots.

11. The redirection method according to claim 8, further comprising:
  inputting the first beam into the dispersion grating at a third angle of incidence in the second direction through the input port; and
  inputting the second beam into the dispersion grating at a fourth angle of incidence in the second direction through the input port, wherein a difference between the third angle of incidence and the fourth angle of incidence falls within a preset range.

12. The redirection method according to claim 8, wherein the optical switching apparatus further comprises a second lens assembly positioned between the input port and the dispersion grating, and the method further comprises:
  coupling the first beam and the second beam to the dispersion grating by using the second lens assembly.

13. The redirection method according to claim 8, further comprising:
  emitting the plurality of first sub-beams at a first angle of emergence in the second direction by using the dispersion grating;
  emitting the plurality of second sub-beams at a second angle of emergence in the second direction by using the dispersion grating, and
  wherein a difference between the first angle of emergence and the second angle of emergence falls within a preset range.

14. The redirection method according to claim 10, further comprising:
  adjusting a target distance by using the first lens assembly, wherein a value of a focal length of the first lens assembly is related to a value of the target distance, and the target distance is a distance between two optical spots in a one-to-one correspondence with the first direction.

15. A reconfigurable optical add-drop multiplexer, comprising a plurality of optical switching apparatuses, wherein different optical switching apparatuses are connected to each other by using an optical fiber, and at least one of the optical switching apparatuses comprises an input port, a dispersion grating, a first lens assembly, a redirection assembly, and an output port; wherein
  the input port is configured to cooperate with a plurality of lenses to input a first beam into the dispersion grating at a first angle of incidence in a first direction, the input port is further configured to input a second beam into the dispersion grating at a second angle of incidence in the first direction, and a difference between absolute values of the first angle of incidence and the second angle of incidence is non-zero;
  the dispersion grating is configured to disperse the first beam to form a plurality of first sub-beams, and the dispersion grating is further configured to disperse the second beam to form a plurality of second sub-beams;
  the first lens assembly is configured to focus the plurality of first sub-beams and the plurality of second sub-beams to the redirection assembly, the plurality of first sub-beams are incident on a first region of the redirection assembly,
    wherein the redirection assembly includes at least one of a liquid crystal array chip, or a micro-electromechanical system (MEMS);
    wherein the plurality of second sub-beams are incident on a second region of the redirection assembly,
    wherein the difference between the absolute values of the first angle of incidence and the second angle of incidence enables the first region and the second region to be separated from each other in the first direction, and enables the first region and the second region to at least partially overlap in a second direction, wherein the first direction is perpendicular to the second direction, and both the first direction and the second direction are perpendicular to a propagation direction of the first beam; and the output port is configured to output the plurality of first sub-beams and the plurality of second sub-beams that are redirected by the redirection assembly;

wherein the optical switching apparatus further comprises a third lens assembly positioned between the input port and the dispersion assembly, and at least one of the first angle of incidence and the second angle of incidence depends on a position of the third lens assembly; and wherein at least one of the first angle of incidence and the second angle of incidence depends on a distance between the input port and a primary optical axis of the third lens assembly.

16. The reconfigurable optical add-drop multiplexer according to claim 15, wherein the first region includes positions at which the plurality of first sub-beams generate first optical spots, the second region includes positions at which the plurality of second sub-beams generate second optical spots, and the first optical spots and the second optical spots at least partially overlap in the second direction.

\* \* \* \* \*